United States Patent
Liu et al.

(10) Patent No.: US 11,277,827 B2
(45) Date of Patent: Mar. 15, 2022

(54) TERMINAL APPARATUS, BASE STATION APPARATUS, AND COMMUNICATION METHOD

(71) Applicants: Sharp Kabushiki Kaisha, Sakai (JP); FG Innovation Company Limited, Tuen Mun (HK)

(72) Inventors: Liqing Liu, Sakai (JP); Tomoki Yoshimura, Sakai (JP); Wataru Ouchi, Sakai (JP); Shoichi Suzuki, Sakai (JP); Shohei Yamada, Sakai (JP)

(73) Assignees: SHARP KABUSHIKI KAISHA, Sakai (JP); FG INNOVATION COMPANY LIMITED, New Territories (HK)

( * ) Notice: Subject to any disclaimer, the term of this patent is extended or adjusted under 35 U.S.C. 154(b) by 53 days.

(21) Appl. No.: 16/628,276

(22) PCT Filed: Jul. 19, 2018

(86) PCT No.: PCT/JP2018/027086
§ 371 (c)(1),
(2) Date: Jan. 3, 2020

(87) PCT Pub. No.: WO2019/021929
PCT Pub. Date: Jan. 31, 2019

(65) Prior Publication Data
US 2020/0154411 A1 May 14, 2020

(30) Foreign Application Priority Data

Jul. 24, 2017 (JP) .............................. JP2017-142774
Aug. 9, 2017 (JP) .............................. JP2017-154079

(51) Int. Cl.
*H04W 72/04* (2009.01)
*H04L 1/18* (2006.01)

(52) U.S. Cl.
CPC ......... *H04W 72/042* (2013.01); *H04L 1/1861* (2013.01)

(58) Field of Classification Search
CPC .................................................. H04W 72/042
See application file for complete search history.

(56) References Cited

U.S. PATENT DOCUMENTS

2017/0272199 A1* 9/2017 Dinan ..................... H04L 1/001
2018/0035332 A1* 2/2018 Agiwal ............. H04W 74/0858
2020/0077343 A1* 3/2020 Yeo ..................... H04W 52/367

OTHER PUBLICATIONS

Sharp, "WF on conflicting PHICH handling for short processing time with 1ms TTI", 3GPP TSG RAN1 #89, R1-1709634, May 15-19, 2017, 6 pages.

(Continued)

*Primary Examiner* — John D Blanton
(74) *Attorney, Agent, or Firm* — Keating & Bennett, LLP

(57) ABSTRACT

A terminal apparatus includes a medium access control layer processing unit configured to manage a HARQ process, and a physical layer processing unit configured to perform processing associated with a PUSCH transmission on a physical layer. A first HARQ process configured for the terminal apparatus determines whether or not to indicate to the physical layer processing unit to generate a transmission of the first HARQ process, based at least on whether or not the transmission of the first HARQ process and a transmission of a second HARQ process occur in the same transmission time. The transmission of the second HARQ process is scheduled so as to use short processing time.

8 Claims, 12 Drawing Sheets

(56) References Cited

OTHER PUBLICATIONS

Ericsson, "Shortened TTI and short processing time—Collection of RAN1 agreements sorted per topic", 3GPP TSG RAN WG1 Meeting #89, R1-1709861, 15 pages.
Official Communication issued in International Patent Application No. PCT/JP2018/027086, dated Aug. 21, 2018.
Ericsson, "New Work Item on shortened TTI and processing time for LTE", 3GPP TSG RAN Meeting #72, RP-161299, Jun. 13-16, 2016, 8 pages.
Zte et al., "Handling collisions between n+4 and n+3", 3GPP TSG RAN WG1 Meeting #88bis, R1-1704633, Apr. 3-7, 2017, pp. 1-4.
Sharp, "Consideration on resolving issues caused by transmission collision with n+4 timing and n+3 timing for 1 ms TTI with shortened processing time", 3GPP TSG RAN WG2 Meeting #99, R2-1707697, Aug. 21-25, 2017, pp. 1-7.

* cited by examiner (A) $k_{ULHARQRTT}$ for TDD

| TDD UL/DL Configuration | subframe index $n$ | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

(B) $k1_{ULHARQRTT}$ for TDD

| TDD UL/DL Configuration | subframe index $n$ | | | | | | | | | |
|---|---|---|---|---|---|---|---|---|---|---|
| | 0 | 1 | 2 | 3 | 4 | 5 | 6 | 7 | 8 | 9 |
| 0 | | | 3 | 3 | 6 | | | 3 | 3 | 6 |
| 1 | | | 3 | 3 | | | | 3 | 3 | |
| 2 | | | 3 | | | | | 3 | | |
| 3 | | | 3 | 3 | 3 | | | | | |
| 4 | | | 3 | 3 | | | | | | |
| 5 | | | 3 | | | | | | | |
| 6 | | | 3 | 3 | 5 | | | 3 | 3 | |

FIG. 6

TERMINAL APPARATUS, BASE STATION APPARATUS, AND COMMUNICATION METHOD

TECHNICAL FIELD

The present invention relates to a terminal apparatus, a base station apparatus, and a communication method.

This application claims priority to JP 2017-142774 filed on Jul. 24, 2017 and JP 2017-154079 filed on Aug. 9, 2017, the contents of which are incorporated herein by reference.

BACKGROUND ART

The 3rd Generation Partnership Project (3GPP) has been studying a radio access method and a radio network for cellular mobile communications (referred to as "Long Term Evolution (LTE)", "Evolved Universal Terrestrial Radio Access (EUTRA)", "Evolved Universal Terrestrial Radio Access Network (EUTRAN)", and "New Radio"). A base station apparatus is also referred to as an evolved NodeB (eNodeB) or a gNodeB. A terminal apparatus is also referred to as a User Equipment (UE). In a cellular communication system, multiple areas are deployed in a cellular structure, with each of the multiple areas being covered by a base station apparatus. A single base station apparatus may manage multiple cells. In 3GPP, latency reduction enhancements have been studied. For example, for a solution for latency reduction, an effort has been started to reduce processing time with respect to a legacy (1 ms) Transmission Time Interval (TTI). (NPL 1)

There is a problem in that transmission of a PUSCH, by which the processing time is not shortened, required by a PHICH and transmission of the PUSCH, by which the processing time is shortened, scheduled by an uplink grant occur in the same uplink subframe. In this case, the 3GPP has been studying that the transmission of the PUSCH scheduled by the uplink grant is performed preferentially (NPL 2).

CITATION LIST

Non Patent Literature

NPL 1: "Work Item on shortened TTI and processing time for LTE", RP-161299, Ericsson, 3GPP TSG RAN Meeting #72, Busan, Korea, Jun. 13-16, 2016.

NPL 2: "Handling collisions between n+4 and n+3", R1-1704633, ZTE, ZTE Microelectronics, 3GPP TSG RAN WG1 Meeting #88bis, 3-7 Apr. 2017.

SUMMARY OF INVENTION

Technical Problem

However, in a case that a transmission of the PUSCH requested by the PHICH is not transmitted due to a transmission of the PUSCH scheduled by the uplink grant, a transmission subsequent to the transmission of the PUSCH that is not transmitted is not fully studied.

An aspect of the present invention has been made in light of the foregoing, and an object of the present invention is to provide a terminal apparatus capable of efficiently communicating with a base station apparatus, an integrated circuit mounted in the terminal apparatus, a communication method used for the terminal apparatus, a base station apparatus for communicating with the terminal apparatus, a communication method used for the base station apparatus, and an integrated circuit mounted in the base station apparatus.

Solution to Problem (1) To accomplish the object described above, aspects of the present invention are contrived to provide the following measures. Specifically, a first aspect of the present invention is a terminal apparatus including: a receiver configured to receive a physical downlink control channel (PDCCH) including an uplink grant; and a medium access control layer processing unit configured to manage a hybrid automatic repeat request (HARQ) entity, wherein the HARQ entity manages a first HARQ process and a second HARQ process in parallel, in a case that the uplink grant is not indicated for the first HARQ process and a transmission time interval (TTI) and a HARQ buffer of the first HARQ process is not empty, the HARQ entity indicates to the first HARQ process to generate a non-adaptive retransmission, and in a case that the non-adaptive retransmission of the first HARQ process collides with a transmission of the second HARQ process scheduled so as to use short processing time, the medium access control layer processing unit sets an ACK for a transport block in a state variable HARQ_FEEDBACK of the first HARQ process, based on an indication from the HARQ entity.

(2) Based on the terminal apparatus according to the first aspect, in a second aspect of the present invention, for FDD, a physical uplink shared channel (PUSCH) transmission corresponding to the second HARQ process is performed in a third subsequent subframe from a subframe in which the uplink grant has been received.

(3) A third aspect of the present invention is a base station apparatus including: a transmitter configured to transmit a physical downlink control channel (PDCCH) including an uplink grant; and a medium access control layer processing unit configured to manage a hybrid automatic repeat request (HARQ) entity, wherein the HARQ entity manages a first HARQ process and a second HARQ process in parallel, in a case that the uplink grant is not indicated for the first HARQ process and a transmission time interval (TTI) and a HARQ buffer of the first HARQ process is not empty, the HARQ entity indicates to the first HARQ process to generate a non-adaptive retransmission, and in a case that the non-adaptive retransmission of the first HARQ process collides with a transmission of the second HARQ process scheduled so as to use short processing time, the medium access control layer processing unit sets an ACK for a transport block in a state variable HARQ_FEEDBACK of the first HARQ process, based on an indication from the HARQ entity.

(4) Based on the base station apparatus according to the third aspect, in a fourth aspect of the present invention, for FDD, a physical uplink shared channel (PUSCH) reception corresponding to the second HARQ process is performed in a third subsequent subframe from a subframe in which the uplink grant has been transmitted.

(5) A fifth aspect of the present invention is a communication method used for a terminal apparatus, the communication method including: a reception step of receiving a physical downlink control channel (PDCCH) including an uplink grant; and a medium access control layer processing step of managing a hybrid automatic repeat request (HARQ) entity, wherein the HARQ entity manages a first HARQ process and a second HARQ process in parallel, in a case that the uplink grant is not indicated for the first HARQ process and a transmission time interval (TTI) and a HARQ buffer of the first HARQ process is not empty, the HARQ entity indicates to the first HARQ process to generate a non-adaptive retransmission, and in a case that the non-adaptive retransmission of the first HARQ process collides with a transmission of the second HARQ process scheduled so as to use short processing time, the medium access control layer processing unit sets an ACK for a transport block in a state variable HARQ_FEEDBACK of the first HARQ process, based on an indication from the HARQ entity.

(6) Based on the communication method according to the sixth aspect, for FDD, a physical uplink shared channel (PUSCH) transmission corresponding to the second HARQ process is performed in a third subsequent subframe from a subframe in which the uplink grant has been received.

(7) A seventh aspect of the present invention is a communication method used for a base station apparatus, the communication method including: a transmission step of transmitting a physical downlink control channel (PDCCH) including an uplink grant; and a medium access control layer processing step of managing a hybrid automatic repeat request (HARQ) entity, wherein the HARQ entity manages a first HARQ process and a second HARQ process in parallel, in a case that the uplink grant is not indicated for the first HARQ process and a transmission time interval (TTI) and a HARQ buffer of the first HARQ process is not empty, the HARQ entity indicates to the first HARQ process to generate a non-adaptive retransmission, and in a case that the non-adaptive retransmission of the first HARQ process collides with a transmission of the second HARQ process scheduled so as to use short processing time, the medium access control layer processing unit sets an ACK for a transport block in a state variable HARQ_FEEDBACK of the first HARQ process, based on an indication from the HARQ entity.

(8) Based on the communication method according to the seventh aspect, in an eighth aspect of the present invention, for FDD, a physical uplink shared channel (PUSCH) reception corresponding to the second HARQ process is performed in a third subsequent subframe from a subframe in which the uplink grant has been transmitted.

Advantageous Effects of Invention

According to an aspect of the present invention, a terminal apparatus can efficiently communicate with a base station apparatus.

BRIEF DESCRIPTION OF DRAWINGS

FIG. 6 is an example indicating the value of a UL HARQ RTT timer corresponding to an uplink HARQ process according to the present embodiment.

DESCRIPTION OF EMBODIMENTS

Embodiments of the present invention will be described below.

Figure 1:
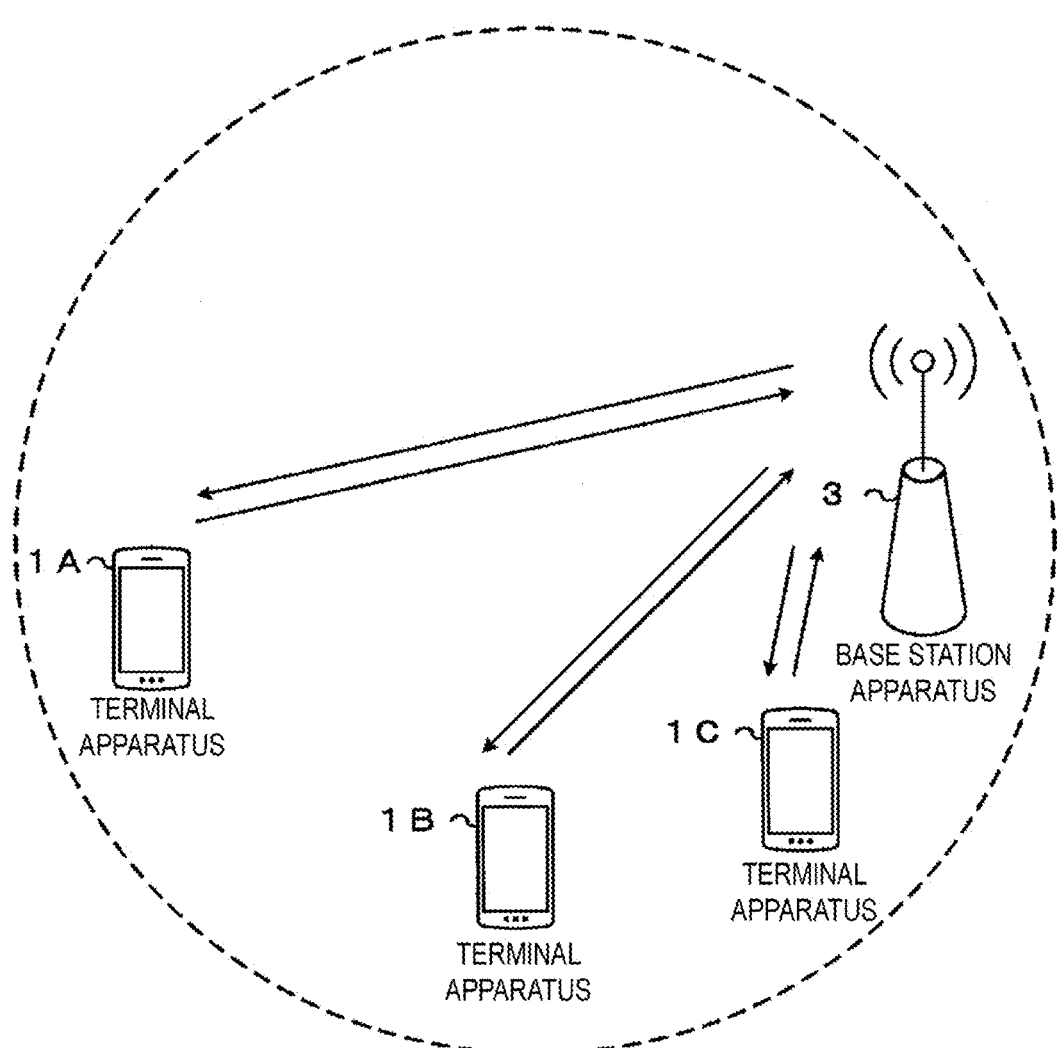
FIG. 1 is a conceptual diagram of a radio communication system according to the present embodiment.

FIG. 1 is a conceptual diagram of a radio communication system according to the present embodiment. In FIG. 1, a radio communication system includes terminal apparatuses 1A to 1C and a base station apparatus 3. The terminal apparatuses 1A to 1C are each referred to as a terminal apparatus 1.

Hereinafter, carrier aggregation will be described.

According to the present embodiment, at least one of multiple serving cells are configured for the terminal apparatus 1. A technology in which the terminal apparatus 1 communicates via the multiple serving cells is referred to as cell aggregation or carrier aggregation. An aspect of the present invention may be applied to each of the multiple serving cells configured for the terminal apparatus 1. Furthermore, an aspect of the present invention may be applied to some of the multiple serving cells configured. Furthermore, an aspect of the present invention may be applied to each of multiple serving cell groups configured. Furthermore, an aspect of the present invention may be applied to some of the multiple serving cell groups configured. The multiple serving cells include at least one primary cell. The multiple serving cells may include at least one or more secondary cells. The multiple serving cells may include one or more Licensed Assisted Access (LAA) cells.

Time Division Duplex (TDD), Frequency Division Duplex (FDD), and/or Licensed Assisted Access (LAA) is applied to a radio communication system according to the present embodiment. For cell aggregation, FDD may be applied to all the multiple serving cells. For cell aggregation, TDD may be applied to all multiple serving cells. For cell aggregation, LAA may be applied to all the multiple serving cells. For cell aggregation, serving cells to which TDD is applied and serving cells to which FDD is applied may be aggregated. For cell aggregation, serving cells to which an LAA cell and FDD are applied may be aggregated. For cell aggregation, serving cells to which an LAA cell and TDD are applied may be aggregated.

The one or more serving cells configured include one primary cell and zero or more secondary cells. The primary cell is a cell in which an initial connection establishment procedure has been performed, a cell in which a connection re-establishment procedure has been initiated, or a cell indicated as a primary cell in a handover procedure. The secondary cell may be configured/added at a point of time when or after a Radio Resource Control (RRC) connection is established.

A carrier corresponding to a serving cell in the downlink is referred to as a downlink component carrier. A carrier corresponding to a serving cell in the uplink is referred to as an uplink component carrier. The downlink component carrier and the uplink component carrier are collectively referred to as a component carrier.

The terminal apparatus 1 can perform simultaneous transmission and/or reception on multiple physical channels in multiple serving cells (component carriers). A single physical channel is transmitted in a single serving cell (component carrier) out of the multiple serving cells (component carriers).

Figure 2:
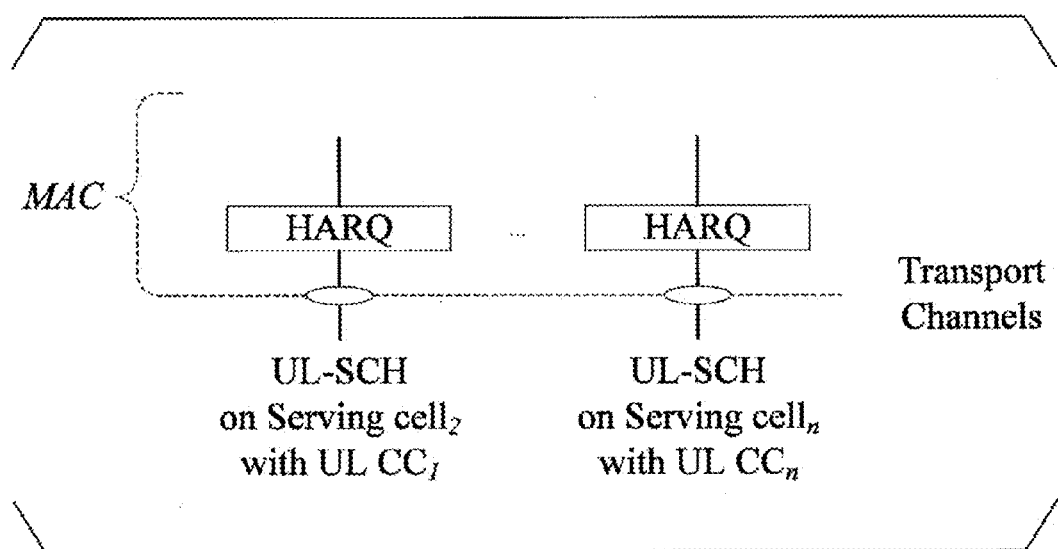
FIG. 2 is a diagram illustrating an example of a structure of a MAC layer for an uplink configured with carrier aggregation according to the present embodiment.

FIG. 2 is a diagram illustrating an example of a structure of a MAC layer for an uplink configured with carrier aggregation according to the present embodiment. In the uplink configured with carrier aggregation, one independent HARQ entity exists for each serving cell (uplink component carrier). In the uplink configured with carrier aggregation, one independent HARQ entity exists in a MAC entity for each serving cell (uplink component carrier). The HARQ entity manages multiple HARQ processes in parallel. The HARQ process is associated with an HARQ buffer. That is, the HARQ entity is associated with multiple HARQ buffers. The HARQ process stores MAC layer data in the HARQ buffer. The HARQ process indicates to a physical layer to transmit the MAC layer data.

In the uplink configured with carrier aggregation, at least one transport block may be generated for each of Transmission Time Intervals (TTIs) for each serving cell. Each of the transport blocks and HARQ retransmission of the transport block are mapped to one serving cell. The TTI is also referred to as a subframe. The transport block is MAC layer data transmitted on an uplink shared channel (UL-SCH).

In the uplink according to the present embodiment, the "transport block", a "MAC Protocol Data Unit (PDU)", "MAC layer data", the "UL-SCH", "UL-SCH data", and "uplink data" are assumed to be the same.

Physical channels and physical signals according to the present embodiment will be described.

In uplink radio communication from the terminal apparatus 1 to the base station apparatus 3, the following uplink physical channels are used. The uplink physical channels are used for transmitting information output from a higher layer.

Physical Uplink Control Channel (PUCCH)
  Physical Uplink Shared Channel (PUSCH)
  Physical Random Access Channel (PRACH)

The PUCCH is used to transmit Uplink Control Information (UCI). The uplink control information includes: downlink Channel State Information (CSI); a Scheduling Request (SR) used to request for a PUSCH (Uplink-Shared Channel (UL-SCH) resource for initial transmission; and a Hybrid Automatic Repeat request ACKnowledgement (HARQ-ACK) for downlink data (a Transport block, a Medium Access Control Protocol Data Unit (MAC PDU), a Downlink-Shared Channel (DL-SCH), or a Physical Downlink Shared Channel (PDSCH)). The HARQ-ACK indicates an acknowledgement (ACK) or a negative-acknowledgement (NACK). The HARQ-ACK is also referred to as ACK/NACK, HARQ feedback, HARQ acknowledge, or HARQ control information.

The scheduling request includes a positive scheduling request or a negative scheduling request. The positive scheduling request indicates that a UL-SCH resource for initial transmission is requested. The negative scheduling request indicates that the UL-SCH resource for the initial transmission is not requested.

The PUSCH is used for transmission of uplink data (Uplink-Shared Channel (UL-SCH)). Furthermore, the PUSCH may be used to transmit the HARQ-ACK and/or channel state information along with the uplink data. Furthermore, the PUSCH may be used to transmit only the channel state information. Furthermore, the PUSCH may be used to transmit only the HARQ-ACK and the channel state information.

Here, the base station apparatus 3 and the terminal apparatus 1 exchange (transmit and/or receive) signals with each other in their respective higher layers. For example, the base station apparatus 3 and the terminal apparatus 1 may transmit and/or receive RRC signaling in a Radio Resource Control (RRC) layer. The base station apparatus 3 and the terminal apparatus 1 may transmit and/or receive, in a Medium Access Control (MAC) layer, a MAC CE. Here, the RRC signaling and/or the MAC CE is also referred to as higher layer signaling. The RRC signaling and/or the MAC CE are/is included in a transport block.

In the present embodiment, "RRC signaling", "RRC layer information", "RRC layer signal" "RRC layer parameter", "RRC message", and "RRC information element" are assumed to mean the same thing.

The PUSCH is used to transmit the RRC signaling and the MAC CE. Here, the RRC signaling transmitted from the base station apparatus 3 may be signaling common to multiple terminal apparatuses 1 in a cell. The RRC signaling transmitted from the base station apparatus 3 may be signaling dedicated to a certain terminal apparatus 1 (also referred to as dedicated signaling). In other words, user device-specific (user device-unique) information is transmitted using the signaling dedicated to a certain terminal apparatus 1.

The PRACH is used to transmit a random access preamble. The PRACH is used for indicating the initial connection establishment procedure, the handover procedure, the connection re-establishment procedure, synchronization (timing adjustment) for uplink transmission, and the request for the PUSCH (UL-SCH) resource.

The following uplink physical signal is used for uplink radio communication. The uplink physical signal is not used to transmit information output from the higher layer, but is used by a physical layer.

Uplink Reference Signal (UL RS)

The following downlink physical channels are used for downlink radio communication from the base station apparatus 3 to the terminal apparatus 1. The downlink physical channels are used for transmitting information output from the higher layer.

Physical Broadcast Channel (PBCH)
  Physical Control Format Indicator Channel (PCFICH)
  Physical Hybrid automatic repeat request Indicator Channel (PHICH)
  Physical Downlink Control Channel (PDCCH)
  Enhanced Physical Downlink Control Channel (EPDCCH)
  Physical Downlink Shared Channel (PDSCH)
  Physical Multicast Channel (PMCH)

The PBCH is used for broadcasting a Master Information Block (MIB, a Broadcast Channel (BCH)) that is shared by the terminal apparatuses 1.

The PCFICH is used for transmission of information indicating a region (OFDM symbols) to be used for transmission of the PDCCH.

The PHICH is used for transmission of an HARQ indicator (HARQ feedback or response information) indicating an ACKnowledgement (ACK) or a Negative ACKnowledgement (NACK) for the uplink data (Uplink Shared Channel (UL-SCH)) received by the base station apparatus 3.

The PDCCH and the EPDCCH are used to transmit Downlink Control Information (DCI). In the present embodiment, the "PDCCH" is assumed to include the "EPDCCH" for the sake of convenience. The downlink control information is also referred to as DCI format. The downlink control information transmitted on one PDCCH includes a downlink grant and HARQ information, or an uplink grant and HARQ information. The downlink grant is also referred to as a downlink assignment or a downlink allocation. The downlink assignment and the uplink grant are not transmitted together on one PDCCH. The downlink grant and the uplink grant may include HARQ information.

The downlink assignment is used for scheduling a single PDSCH within a single cell. The downlink assignment is used for scheduling the PDSCH within the same subframe as the subframe in which the downlink grant has been transmitted.

The uplink grant may be used for scheduling a single PUSCH within a single cell. The uplink grant may be used for scheduling a single PUSCH within a sequence of subframes succeeding the subframe in which the uplink grant has been transmitted.

The HARQ information may include at least a New Data Indicator (NDI) and information indicating a transport block size. The downlink assignment transmitted on the PDCCH provides HARQ information. The HARQ information transmitted on the PDCCH along with the downlink assignment also includes information indicating the HARQ process number in the downlink (downlink HARQ process Identifier/Identity, downlink HARQ process number). The HARQ information provided by the downlink assignment (or associated with the downlink assignment) also includes information indicating the HARQ process number in the downlink (downlink HARQ process Identifier/Identity, downlink HARQ process number). The HARQ information associated with an asynchronous HARQ and associated with the uplink grant may include information indicating the HARQ process number in the uplink (uplink HARQ process Identifier/ Identity, uplink HARQ process number). To be associated with the asynchronous HARQ may be a state that the HARQ process in which the HARQ information is delivered corresponds to the asynchronous HARQ. The HARQ information transmitted on the PDCCH with the uplink grant for an asynchronous HARQ may include information indicating the HARQ process number in the uplink (uplink HARQ process Identifier/Identity, uplink HARQ process number). The HARQ information associated with a synchronous HARQ and associated with the uplink grant need not include information indicating the HARQ process number in the uplink (uplink HARQ process Identifier/Identity, uplink HARQ process number). To be associated with the synchronous HARQ may be a state that the HARQ process in which the HARQ information is delivered corresponds to the synchronous HARQ. The HARQ information transmitted on the PDCCH with the uplink grant for a synchronous HARQ need not include information indicating the HARQ process number in the uplink (uplink HARQ process Identifier/ Identity, uplink HARQ process number).

The NDI indicates an initial transmission or retransmission. An HARQ entity indicates to a certain HARQ process to trigger the initial transmission in a case that the NDI provided by the HARQ information has been toggled relative to the value of the NDI for the transmission preceding the certain HARQ process. The HARQ entity indicates to a certain HARQ process to trigger the retransmission in a case that the NDI provided by the HARQ information has not been toggled as compared to the value of the NDI for the transmission preceding the certain HARQ process. Note that the HARQ process may determine whether NDI has been toggled.

The HARQ entity identifies the HARQ process to which the uplink grant and the HARQ information correspond, and passes the uplink grant and the HARQ information to the identified HARQ process. The HARQ process stores the uplink grant and the HARQ information passed from the HARQ entity.

Cyclic Redundancy Check (CRC) parity bits added to the downlink control information transmitted on one PDCCH are scrambled with a Cell-Radio Network Temporary Identifier (C-RNTI), a Semi Persistent Scheduling (SPS) C-RNTI, or a Temporary C-RNTI. The C-RNTI and the SPS C-RNTI are identifiers for identifying a terminal apparatus within a cell. The Temporary C-RNTI serves as an identifier for identifying the terminal apparatus 1 that has transmitted a random access preamble in a contention based random access procedure.

The C-RNTI and the Temporary C-RNTI are used to identify PDSCH transmission or PUSCH transmission in a single subframe. The SPS C-RNTI is used to periodically allocate a resource for the PDSCH or the PUSCH.

Hereinafter, unless otherwise specified, the CRC parity bits added to the downlink control information according to the present embodiment are scrambled with the C-RNTI.

The PDCCH is transmitted on a PDCCH candidate. The terminal apparatus 1 monitors a set of PDCCH candidates in the serving cell. The set of PDCCH candidates is referred to as a search space. The search space includes at least a Common Search Space (CSS) and a UE-specific Search Space (USS). The UE-specific search space is derived at least from the value of the C-RNTI set by the terminal apparatus 1. That is, the UE-specific search space is separately derived for each terminal apparatus 1. The common search space is a search space common to the multiple terminal apparatuses 1, and includes a Control Channel Element (CCE) with a predetermined index. The CCE includes multiple resource elements. The monitoring means an attempt to decode the PDCCH in accordance with a certain DCI format.

The PDSCH is used to transmit downlink data (Downlink Shared Channel (DL-SCH)).

The PMCH is used to transmit multicast data (Multicast Channel (MCH)).

The following downlink physical signals are used in the downlink radio communication. The downlink physical signals are not used to transmit the information output from the higher layer, but are used by the physical layer.

Synchronization signal (SS)
Downlink Reference Signal (DL RS)

The synchronization signal is used for the terminal apparatus 1 to establish synchronization in a frequency domain and a time domain in the downlink. In the TDD scheme, the synchronization signal is mapped to subframes 0, 1, 5, and 6 within a radio frame. In the FDD scheme, the synchronization signal is mapped to subframes 0 and 5 within a radio frame.

The downlink reference signal is used for the terminal apparatus 1 to perform channel compensation on a downlink physical channel. The downlink reference signal is used for the terminal apparatus 1 to obtain the downlink channel state information.

According to the present embodiment, the following five types of downlink reference signals are used.

Cell-specific Reference Signal (CRS)

UE-specific Reference Signal (URS) associated with the PDSCH

Demodulation Reference Signal (DMRS) associated with the EPDCCH

Non-Zero Power Chanel State Information-Reference Signal (NZP CSI-RS)

Zero Power Chanel State Information-Reference Signal (ZP CSI-RS)

Multimedia Broadcast and Multicast Service over Single Frequency Network Reference signal (MBSFN RS)

Positioning Reference Signal (PRS)

The downlink physical channels and the downlink physical signals are collectively referred to as a downlink signal. The uplink physical channels and the uplink physical signals are collectively referred to as an uplink signal. The downlink physical channels and the uplink physical channels are collectively referred to as a physical channel. The downlink physical signals and the uplink physical signals are collectively referred to as physical signals.

The BCH, the MCH, the UL-SCH, and the DL-SCH are transport channels. A channel used in the Medium Access Control (MAC) layer is referred to as a transport channel. A unit of the transport channel used in the MAC layer is also referred to as a transport block (TB) or a MAC Protocol Data Unit (PDU). A Hybrid Automatic Repeat reQuest (HARQ) is controlled for each transport block in the MAC layer. The transport block is a unit of data that the MAC layer delivers to the physical layer. In the physical layer, the transport block is mapped to a codeword, and coding processing is performed for each codeword.

A structure of a radio frame in the present embodiment will be described.

Figure 3:
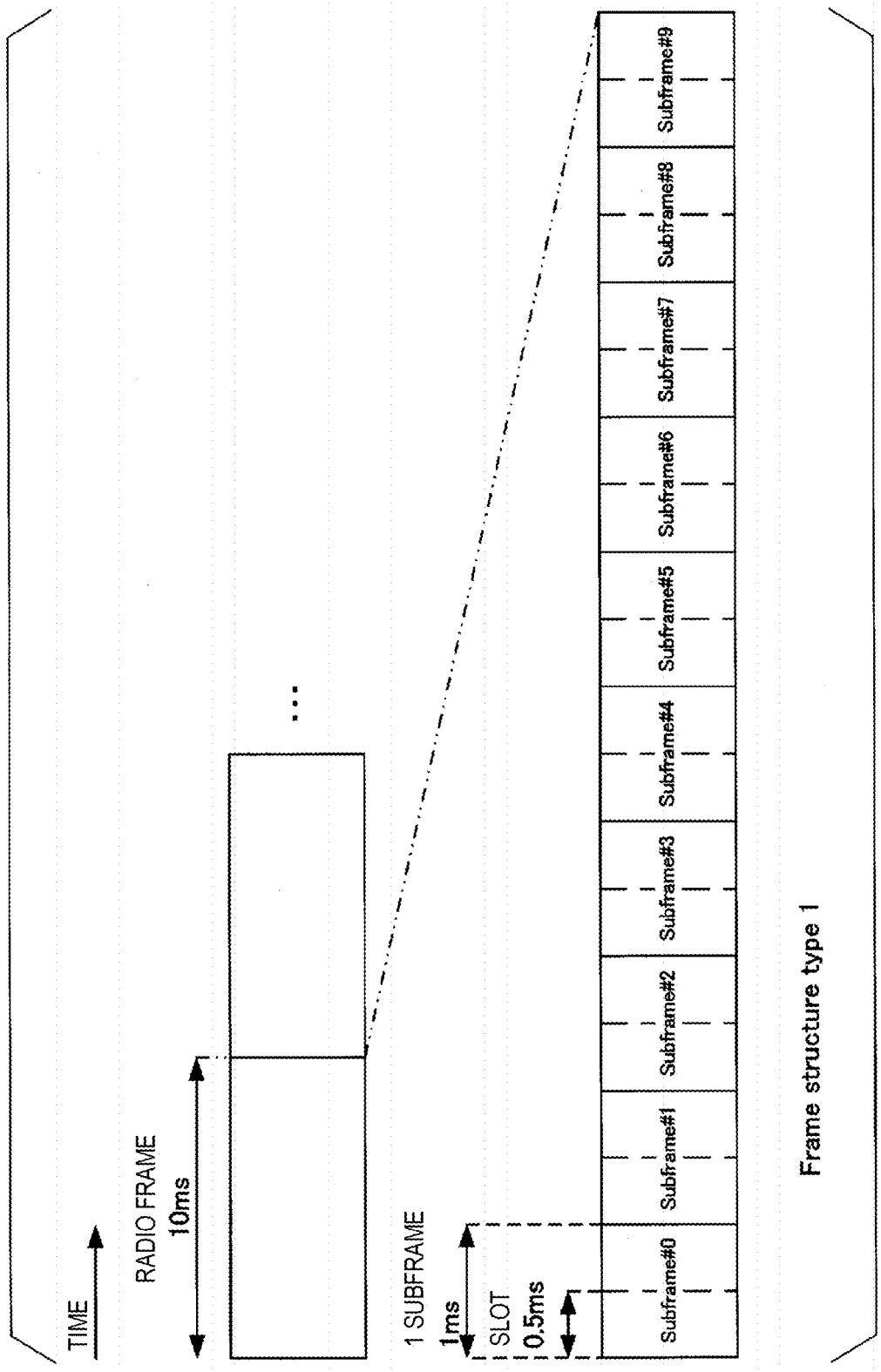
FIG. 3 is a diagram illustrating a schematic configuration of a radio frame according to the present embodiment.

FIG. 3 is a diagram illustrating a schematic configuration of a radio frame according to the present embodiment. In FIG. 3, the horizontal axis is a time axis. Each type 1 radio frame is 10 ms in length, and is defined by 10 subframes. Each of the subframes is 1 ms in length and is defined by two consecutive slots. Each of the slots is 0.5 ms in length. The i-th subframe within a radio frame includes the (2×i)-th slot and the (2×i+1)-th slot.

The number of symbols included in one subframe described above may be defined based on a Subcarrier Spacing for a physical channel used for transmission and/or reception. For example, in a case that the subcarrier spacing is 15 kHz, the number of symbols included in one subframe may be 14. Furthermore, in a case that the subcarrier spacing is 30 kHz, the number of symbols included in one subframe may be 28. Here, the subcarrier spacing may be any of 3.75 kHz, 7.5 kHz, 15 kHz, 30 kHz, 60 kHz, 120 kHz, and 240 kHz. Obviously, a reduced subcarrier spacing increases a symbol length, and an increased subcarrier spacing reduces the symbol length. The symbol used for the uplink transmission is an OFDM (CP-OFDM, Cyclic Prefix-OFDM) symbol, or an SC-FDMA (DFT-S-OFDM) symbol. The symbol used for the downlink transmission is the OFDM symbol symbol. Furthermore, the subframe may include one or more slots.

A transmission timing of the HARQ-ACK for the downlink transmission (PDSCH) according to the present embodiment will be described.

For the transmission timing of the HARQ-ACK for the PDSCH, in a case that the terminal apparatus 1 detects the PDSCH in a subframe n−j for FDD, the terminal apparatus 1 transmits HARQ-ACK for the PDSCH in a subframe n. That is, the transmission timing of the HARQ-ACK for the PDSCH corresponds to the j-th succeeding subframe from the subframe in which the PDSCH has been transmitted.

Hereinafter, the transmission timing of the PUSCH for the uplink grant according to the present embodiment will be described.

For a transmission timing of the PUSCH for the uplink grant, in a case that the terminal apparatus 1 detects the PDCCH (uplink grant) in the subframe n for FDD, the terminal apparatus 1 transmits the PUSCH for the uplink grant in a subframe n+k. That is, the transmission timing of the PUSCH for the uplink grant corresponds to the k-th succeeding subframe from the subframe in which the uplink grant has been detected.

For the FDD, k and j may be 4. k and j that are 4 may be referred to as normal timings (normal processing time). With the normal processing time, the transmission timing of the HARQ-ACK for the PDSCH and the transmission timing of the PUSCH for the uplink grant correspond to four subframes.

Furthermore, the value of k and/or j may be a value smaller than 4. For example, the value of k and/or j may be 3. Furthermore, for example, the value of k and/or j may be 2. The value of k and/or j may be determined depending on the processing capability of the terminal apparatus 1. k and j that are smaller than 4 may be referred to as a reduced timing (short processing time, reduced processing time). With the short processing time, the transmission timing of the HARQ-ACK for the PDSCH and the transmission timing of the PUSCH for the uplink grant correspond to fewer than four subframes. That is, the shortening processing capability of the terminal apparatus 1 is the capability of transmitting and/or receiving data by using the short processing time. Here, the value of k and/or j is defined by specifications or the like, and may be a value known to the base station apparatus 3 and the terminal apparatus 1.

Here, the processing capability of the terminal apparatus 1 may be indicated by capability information about the terminal apparatus 1. In the present embodiment, shortening capability information about the terminal apparatus 1 may be capability information about the terminal apparatus 1 associated with support (or non-support) of the capability of shortening the normal processing time. The terminal apparatus 1 with the shortening processing capability can transmit and/or receive data by using a processing time (reduced processing time, short processing time) shorter than the normal processing time.

In a case that the base station apparatus 3 (EUTRAN) needs the capability information about the terminal apparatus 1, the base station apparatus 3 initiates a procedure relating to obtaining the capability information about the terminal apparatus 1 in a connected mode (that is, the terminal apparatus 1 for which an RRC connection is established). The base station apparatus 3 queries the capability information (e.g., the shortening processing capability) about the terminal apparatus 1. The terminal apparatus 1 transmits the capability information about the terminal apparatus 1 to the base station apparatus 3 in response to the query. The base station apparatus 3 determines whether or not the terminal apparatus 1 supports a prescribed capability based on the capability information of the terminal apparatus 1. In a case that the terminal apparatus 1 supports the prescribed capability, the base station apparatus 3 transmits configuration information corresponding to the prescribed capability to the terminal apparatus 1 by using higher layer signaling or the like. Based on whether or not the configuration information corresponding to the capability information is configured, the terminal apparatus 1 determines whether to perform transmission and/or reception based on the capability or to perform transmission and/or reception not based on the capability. For example, the configuration information corresponding to the shortening processing capability may be defined as an RRC layer parameter shortProcessingTime. The terminal apparatus 1 configured with the RRC layer parameter shortProcessingTime may transmit and/or receive data by using the short processing time. The terminal apparatus 1 not configured with the RRC layer parameter shortProcessingTime may transmit and/or receive data by using the normal processing time.

The RRC layer parameter shortProcessingTime is a parameter indicating whether or not to perform data transmission and/or reception based on the short processing time in a certain serving cell. Here, configuration of the RRC parameter shortProcessingTime indicates that the value of the parameter shortProcessingTime transmitted by the higher layer signaling is True. The value of the parameter shortProcessingTime configured with True may include that transmission and/or reception is performed using the short processing time (e.g., 3 ms). Hereinafter, a lack of configuration of the RRC parameter shortProcessingTime may indicate that the value of the parameter shortProcessingTime transmitted by the higher layer signaling is False or that the received higher layer signaling (higher layer information) does not include the RRC parameter shortProcessingTime. The value of the parameter shortProcessingTime configured with a value False may include that transmission and/or reception is performed using the normal processing time (e.g., 4 ms).

Note that the RRC parameter shortProcessingTime may be defined (prescribed) for the serving cell. That is, the base station apparatus 3 may transmit (notify), to the terminal apparatus 1, information about whether or not the RRC parameter shortProcessingTime is configured for each serving cell. The terminal apparatus 1 not configured with the RRC parameter shortProcessingTime for the certain serving cell may perform transmission and/or reception by using the normal processing time in the serving cell. The terminal apparatus 1 configured with the RRC parameter shortProcessingTime for a certain serving cell may perform transmission and/or reception by using the short processing time (e.g., 3 ms) in the serving cell. Here, in a case that the downlink assignment or the uplink grant in the serving cell in which the RRC parameter shortProcessingTime is configured is detected in a common search space, the terminal apparatus 1 may perform transmission and/or reception by using the normal processing time. In a case that the downlink assignment or the uplink grant in the serving cell is detected in a UE-specific search space, the terminal apparatus 1 may perform transmission and/or reception by using the short processing time. Whether to configure the RRC parameter shortProcessingTime for a certain serving cell is optional for higher layer (RRC).

The RRC parameter shortProcessingTime may be defined (prescribed) for each PUCCH Group. The base station apparatus 3 may transmit (notify), to the terminal apparatus 1, information about whether or not the RRC parameter shortProcessingTime is configured for each PUCCH group. The configuration related to the RRC parameter shortProcessingTime may be applied to each of the serving cells belonging to the same PUCCH Group. For example. The terminal apparatus 1 configured with the RRC parameter shortProcessingTime for a certain PUCCH group may perform transmission and/or reception by using the short processing time in a serving cell belonging to the PUCCH group. The terminal apparatus 1 not configured with the RRC parameter shortProcessingTime for the certain PUCCH group may perform transmission and/or reception by using the normal processing time in the serving cell belonging to the PUCCH group. Here, in a case that the downlink assignment or the uplink grant in the serving cell belonging to the PUCCH group and in which the RRC parameter shortProcessingTime is configured is detected in a common search space, the terminal apparatus 1 may perform transmission and/or reception by using the normal processing time. In a case that the downlink assignment or the uplink grant in the serving cell belonging to the PUCCH group and in which the RRC parameter shortProcessingTime is configured is detected in a UE-specific search space, the terminal apparatus 1 may perform transmission and/or reception by using the short processing time.

The PUCCH group includes a Primary PUCCH Group and a Secondary PUCCH Group. The primary PUCCH group is a group of multiple serving cells including a primary cell in which the PUCCH is configured. The secondary PUCCH group is a group of multiple secondary cells including at least a secondary cell in which the PUCCH is configured.

Hereinafter, DCI formats according to the present embodiment will be described.

DCI format 0 is used for scheduling of the PUSCH. DCI Format 0 does not include the "Redundancy version" field and the "HARQ process number" field. Furthermore, DCI format 0D includes the uplink grant and is used for scheduling of the PUSCH. DCI format 0D includes the "Redundancy version" field and the "HARQ process number" field. Here, DCI format 0D may be used for scheduling of the PUSCH in a serving cell configured with the short processing time. Note that DCI format 0 and DCI format 0D may be referred to as the uplink grant.

The terminal apparatus 1 not configured with the RRC layer parameter shortProcessingTime for the serving cell may decode the PDCCH including DCI format 0 in the common search space and the UE-specific search space in the serving cell. The terminal apparatus 1 not configured with the RRC layer parameter shortProcessingTime for the serving cell need not decode the PDCCH including DCI format 0D in the UE-specific search space in the serving cell. DCI format 0 may be used for an uplink synchronous HARQ.

The terminal apparatus 1 configured with the RRC layer parameter shortProcessingTime for the serving cell may decode the PDCCH including DCI format 0 in the common search space in the serving cell and decode the PDCCH including DCI format 0D in the UE-specific search space in the serving cell. The terminal apparatus 1 configured with the RRC layer parameter shortProcessingTime for the serving cell need not decode the PDCCH including DCI format 0 in the UE-specific search space in the serving cell. DCI format 0D may be used for an uplink asynchronous HARQ. DCI format 0D is not used for the uplink synchronous HARQ. The number of the uplink HARQ process is provided by the HARQ process number" field included in DCI format 0D. For FDD, the terminal apparatus 1 may transmit the PUSCH in the third succeeding subframe from the subframe in which the PDCCH has been decoded, based on decoding of the PDCCH including DCI format 0D in the UE-specific search space. Furthermore, based on decoding of the PDCCH including DCI format 0 in the common search space, the terminal apparatus 1 may transmit the PUSCH in the fourth succeeding subframe from the subframe in which the PDCCH has been decoded.

In a case that the terminal apparatus 1 detects the PDCCH (uplink grant, DCI format 0, DCI format 0D) in the subframe n, the terminal apparatus 1 transmits the PUSCH for the uplink grant in the subframe n+k. In a case that the RRC layer parameter shortProcessingTime for the serving cell is not configured, and the PDCCH (uplink grant, DCI format 0) is detected in the common search space or the UE-specific search space in the subframe n, k may be 4. In a case that the RRC layer parameter shortProcessingTime for the serving cell is configured, and the PDCCH (uplink grant, DCI format 0) is detected in the common search space in the subframe n, k may be 4. In a case that the RRC layer parameter shortProcessingTime for the serving cell is configured, and the PDCCH (uplink grant, DCI format 0D) is detected in the UE-specific search space in the subframe n, k may be 3.

As described above, the HARQ information corresponding to the HARQ process is delivered from the physical layer to the higher layers. Whether or not information indicating the HARQ process number (HARQ process ID) is included in the HARQ information may be determined based at least on (1) a type of search space to which the PDCCH including the uplink grant is mapped, and/or (2) whether or not the RRC layer parameter shortProcessingTime is configured. In a serving cell not configured with the RRC layer parameter shortProcessingTime, the information indicating the HARQ process number need not be included in the HARQ information. In a serving cell configured with the RRC layer parameter shortProcessingTime, whether or not the information indicating the HARQ process number (HARQ process ID) is included in the HARQ information may be determined based on a type of search space to which the PDCCH including the uplink grant is mapped. In other words, in the serving cell configured with the RRC layer parameter shortProcessingTime, in a case that the uplink grant corresponding to the uplink HARQ process is received in the common search space, the information indicating the HARQ process number need not be included in the HARQ information. In the serving cell configured with the RRC layer parameter shortProcessingTime, in a case that the uplink grant corresponding to the uplink HARQ process is received in the UE-specific search space, the information indicating the HARQ process number may be included in the HARQ information. In the serving cell configured with the RRC layer parameter shortProcessingTime, in a case that the DCI format including the uplink grant corresponding to the uplink HARQ process is received in the UE-specific search space, the HARQ process number field included in the DCI format may be a 3-bit field. In other words, the HARQ process number field may be a field indicating only a part of the HARQ process configured for the terminal apparatus 1. The HARQ process number field may be a field indicating the HARQ process number associated with the asynchronous HARQ, out of the HARQ process configured for the terminal apparatus 1. The HARQ process associated with the asynchronous HARQ may be type 1 described below. For example, in the serving cell not configured with the RRC layer parameter shortProcessingTime, the number of HARQ processes configured for the terminal apparatus 1 may be 8 in FDD. In the serving cell configured with the RRC layer parameter shortProcessingTime, the number of HARQ processes configured for the terminal apparatus 1 may be 16 in FDD.

In the present embodiment, a search space to which the PDCCH including the uplink grant is mapped may be interpreted as a search space in which the uplink grant is received.

The HARQ process in the uplink includes the synchronous HARQ and the asynchronous HARQ. Hereinafter, the synchronous HARQ in the uplink will be described.

In the synchronous HARQ, the HARQ process to which the uplink grant corresponds is associated with a subframe in which the uplink grant has been received and/or a subframe in which PUSCH (UL-SCH) corresponding to the uplink grant is transmitted. In the synchronous HARQ, the terminal apparatus 1 derives the HARQ process to which the uplink grant corresponds from the subframe in which the uplink grant has been received and/or the subframe in which PUSCH (UL-SCH) corresponding to the uplink grant is transmitted. That is, in the synchronous HARQ, the HARQ entity may identify the HARQ process to which the uplink grant corresponds without using the information included in the uplink grant.

Figure 4:
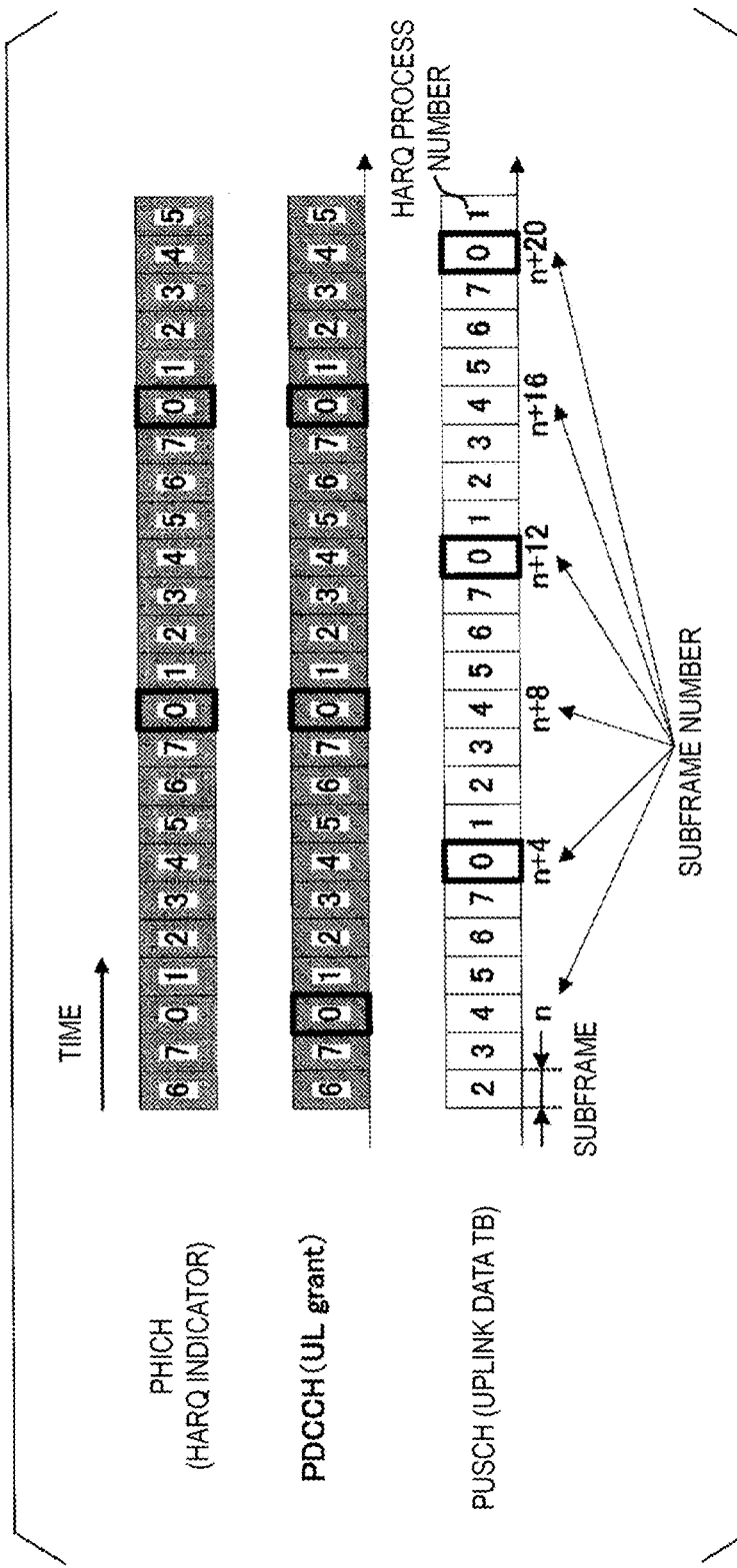
FIG. 4 is a diagram illustrating an example of an uplink synchronous HARQ according to the present embodiment.

FIG. 4 is a diagram illustrating an example of the uplink synchronous HARQ according to the present embodiment. In FIG. 4, one subframe corresponds to one HARQ process. In FIG. 4, numbers in rectangles indicate the numbers of corresponding HARQ processes. In the synchronous HARQ, the HARQ entity derives the HARQ process from a subframe in which UL-SCH data in the MAC layer is transmitted or a subframe in which DCI format 0 corresponding to the UL-SCH data in the MAC layer has been detected.

In FIG. 4, the subframe in which the MAC layer data corresponding to the uplink grant is transmitted is derived from the subframe in which the uplink grant has been received. For example, the UL-SCH data in the MAC layer corresponding to the uplink grant may be transmitted on the PUSCH in the fourth succeeding subframe from the subframe in which the uplink grant has been received.

In synchronous HARQ, the HARQ indicator is transmitted on the PHICH in response to an uplink transmission. The correspondence between the subframe in which the uplink transmission has been performed and the subframe in which the corresponding PHICH is transmitted is predetermined. For example, the HARQ indicator for the MAC layer data is transmitted on the PHICH in the fourth succeeding subframe from the subframe in which the MAC layer data has been transmitted on the PUSCH. Furthermore, for example, the MAC layer data is retransmitted on the PUSCH in the fourth succeeding subframe from the subframe in which the NACK has been received on the PHICH.

Hereinafter, the asynchronous HARQ in the uplink according to the present embodiment will be described.

Figure 5:
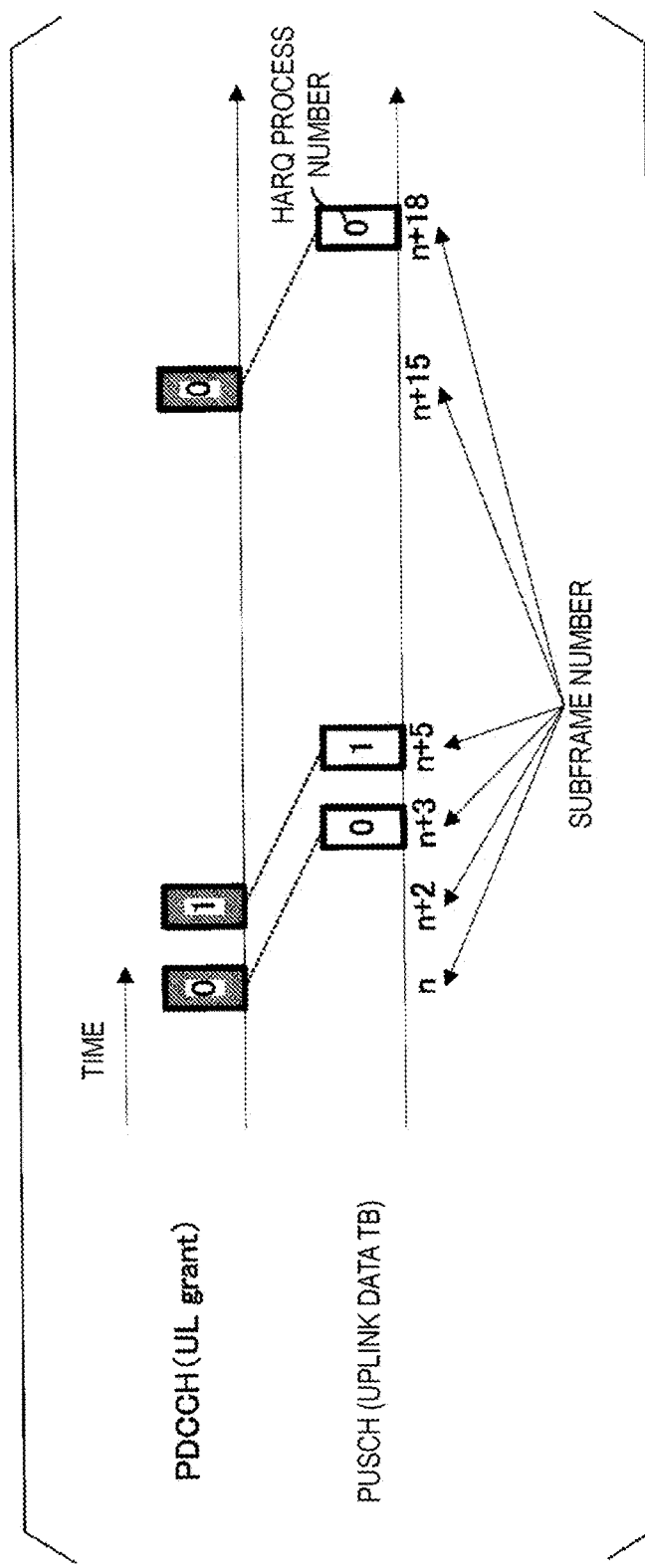
FIG. 5 is a diagram illustrating an example of an uplink asynchronous HARQ according to the present embodiment.

FIG. 5 is a diagram illustrating an example of the uplink asynchronous HARQ according to the present embodiment. In FIG. 5, one subframe corresponds to one HARQ process. In FIG. 5, numbers in rectangles indicate the numbers of corresponding HARQ processes. In the asynchronous HARQ, in a case that the uplink grant is included in the PDCCH mapped to a UE-specific search space, the HARQ entity derives the HARQ process from an "HARQ process number" field. In the asynchronous HARQ, in a case that the uplink grant is included in a random access response, the HARQ entity may use HARQ process with a specific number. The specific number may be 0. The specific number may be a predetermined number.

In the asynchronous HARQ, the HARQ indicator is not transmitted on the PHICH in response to the uplink transmission. That is, in the asynchronous HARQ, retransmissions of the MAC layer data (transport block) are always scheduled via the PDCCH. In FIG. 5, the subframe in which the MAC layer data corresponding to the uplink grant is transmitted is derived from the subframe in which the uplink grant has been received. For example, with the short processing time, MAC layer data corresponding to the uplink grant may be transmitted on the PUSCH in a subframe three subframes after the subframe in which the uplink grant has been received.

In the present embodiment, whether the synchronous HARQ or the asynchronous HARQ is applied to the uplink HARQ process in a certain serving cell may be derived based on whether the RRC layer parameter shortProcessingTime is configured for the serving cell or not. In a serving cell not configured with the RRC layer parameter shortProcessingTime, the synchronous HARQ may be applied to the uplink HARQ process. In a serving cell configured with the RRC layer parameter shortProcessingTime, the asynchronous HARQ may be applied to the uplink HARQ process. Whether the synchronous HARQ or the asynchronous HARQ is applied to the uplink HARQ process in the serving cell configured with the RRC layer parameter shortProcessingTime may be derived from the type of the search space in which the uplink grant has been received. For example, in a case that the uplink grant corresponding to the uplink HARQ process is received in the common search space, the type of uplink HARQ process may be the synchronous HARQ. In other words, the synchronous HARQ is applied to the MAC layer data corresponding to the uplink grant received in the common search space. Furthermore, in a case that the uplink grant corresponding to the uplink HARQ process is received in the UE-specific search space, the type of the uplink HARQ process may be the asynchronous HARQ. In other words, the asynchronous HARQ is applied to the MAC layer data corresponding to the uplink grant received in the UE-specific search space.

In the serving cell configured with the RRC layer parameter shortProcessingTime, it may be interpreted that the HARQ process to which the asynchronous HARQ is applied is scheduled so as to use the short processing time (ShortProcessingTime). In other words, in the serving cell configured with the RRC layer parameter shortProcessingTime, it may be interpreted that the HARQ process to which the synchronous HARQ is applied is scheduled not to use the short processing time (ShortProcessingTime). In other words, in the serving cell configured with the RRC layer parameter shortProcessingTime, it may be interpreted that the HARQ process to which the synchronous HARQ is applied is scheduled so as to use the normal processing time.

For the HARQ process scheduled so as to use the short processing time, for FDD, the UL HARQ RTT timer corresponding to the HARQ process is set to three subframes. For TDD, the UL HARQ RTT timer corresponding to the HARQ process may be configured (set) to $k1_{ULHARQRTT}$ subframes. The value of $k1_{ULHARQRTT}$ is specified (selected, determined) based on the UL-DL configuration and/or the reduced processing time. For example, the value of $k1_{ULHARQRTT}$ may be provided from FIG. 6(B). FIG. 6 is an example indicating the value of the UL HARQ RTT timer corresponding to the uplink HARQ process according to the present embodiment.

For the HARQ process scheduled not to use the short processing time, for FDD, the UL HARQ RTT timer corresponding to the HARQ process is set to four subframes. For TDD, the UL HARQ RTT timer corresponding to the HARQ process may be configured (set) to $k_{ULHARQRTT}$ subframes. The value of $k_{ULHARQRTT}$ is specified (selected, determined) based on the UL-DL configuration and/or the reduced processing time. For example, the value of $k_{ULHARQRTT}$ may be provided from FIG. 6(A).

A UL HARQ RTT Timer is managed for each uplink HARQ process. The UL HARQ RTT timer corresponding to the uplink HARQ process indicates a minimum interval from transmission of uplink data to transmission of the uplink grant for retransmission of the uplink data (uplink HARQ retransmission grant). In other words, the UL HARQ RTT timer corresponding to the uplink HARQ process indicates a minimum amount of subframes before the terminal apparatus 1 (MAC entity) expects the uplink grant (uplink HARQ retransmission grant) for the uplink retransmission.

In the serving cell configured with the RRC layer parameter shortProcessingTime, in the serving cell, the terminal apparatus 1 includes (type 1) the HARQ process scheduled so as to use the short processing time, and (type 2) the HARQ process scheduled not to use the short processing time. Being the terminal apparatus 1, the MAC entity delivers the uplink grant and the HARQ information received from the physical layer for a certain TTI to the HARQ entity.

For each TTI, the HARQ entity identifies the HARQ process associated with the TTI. Based on whether or not the information indicating the HARQ process number is included in the HARQ information for a certain TTI, the HARQ entity may determine any of the two types. In other words, in the serving cell configured with the RRC layer parameter shortProcessingTime, in a case that the information indicating the HARQ process number is included in the HARQ information, the HARQ entity may identify (determine) the HARQ process corresponding to the TTI as type 1. In the serving cell configured with the RRC layer parameter shortProcessingTime, in a case that the information indicating the HARQ process number is not included in the HARQ information, the HARQ entity may identify (specify) the HARQ process corresponding to the TTI as type 2.

In the present embodiment, the HARQ process manages a state variable HARQ_FEEDBACK. The HARQ process indicates to the physical layer to generate a transmission in response to the uplink grant in a case that the HARQ entity requests a non-adaptive retransmission and the NACK is set in the state variable HARQ_FEEDBACK.

The HARQ process to which the synchronous HARQ is applied sets the ACK or the NACK in the state variable HARQ_FEEDBACK, based on the HARQ indicator received on the PHICH. The HARQ process to which the asynchronous HARQ is applied need not set the ACK or the NACK in the state variable HARQ_FEEDBACK, based on the HARQ indicator received on the PHICH.

The HARQ process to which the synchronous HARQ is applied sets the NACK in the state variable HARQ_FEEDBACK, based on the initial transmission from the HARQ entity or a request for non-adaptive retransmission. Furthermore, the HARQ process to which the asynchronous HARQ is applied sets the ACK in the state variable HARQ_FEEDBACK, based on the initial transmission from the HARQ entity or the request for adaptive retransmission. Note that the adaptive retransmission is retransmission indicated by the NDI and non-adaptive retransmission is retransmission indicated by the HARQ indicator. This prevents the HARQ process to which the asynchronous HARQ is applied from performing the non-adaptive retransmission. Additionally, in a case that only the HARQ ACK is received, the corresponding HARQ process keeps the MAC layer data in HARQ buffer.

A procedure relating to the PHICH according to the present embodiment will be described below.

Figure 7:
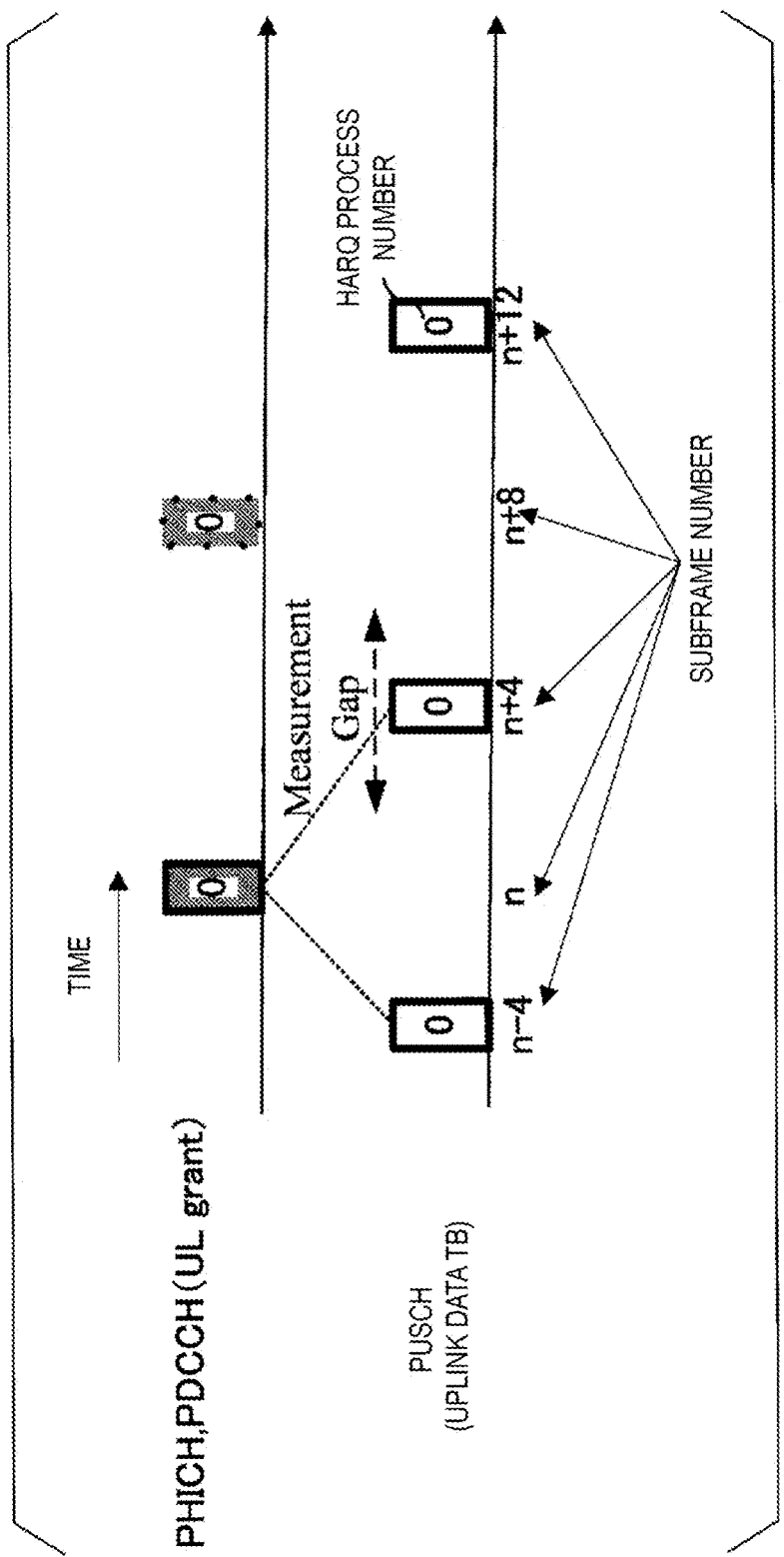
FIG. 7 is a diagram illustrating an example of PUSCH synchronous transmission by a PHICH according to the present embodiment.

FIG. 7 is a diagram illustrating an example of PUSCH synchronous transmission by the PHICH according to the present embodiment. In FIG. 7, one subframe corresponds to one HARQ process. In FIG. 7, numbers in rectangles indicate the numbers of corresponding HARQ processes.

In FIG. 7, the terminal apparatus 1 transmits the PUSCH in a subframe n−4. In FIG. 7, the terminal apparatus 1 receives the PHICH in a subframe n. The PHICH in the subframe n is associated with the PUSCH transmitted in the subframe n−4. The PHICH in the subframe n is used to transmit the HARQ indicator indicating the ACK or NACK for the transport block transmitted on the PUSCH of the subframe n−4. In other words, in a case that a certain transport block is transmitted on the PUSCH in the subframe n−4, the HARQ indicator indicating the ACK or NACK for the transport block is transmitted (allocated) on the PHICH in the subframe n. Here, for example, the HARQ process number corresponding to the PUSCH (transport block) transmitted in the subframe n−4 corresponds to 0.

Next, the terminal apparatus 1 may determine whether or not to trigger non-adaptive retransmission of the transport block, based on the HARQ indicator transmitted on the PHICH in the subframe n. For example, in a case that the ACK is decoded on the PHICH in the subframe n, the ACK for the transport block may be delivered to a higher layer. That is, the non-adaptive retransmission of the transport block corresponding to the HARQ process number 0 need not be performed in a subframe n+4. After the ACK has been decoded, retransmission or initial transmission of the transport block corresponding to the HARQ process number 0 is scheduled via the PDCCH.

Furthermore, for example, in a case that the NACK is decoded on the PHICH in the subframe n, the NACK for the transport block may be delivered to a higher layer. That is, the non-adaptive retransmission of the transport block corresponding to the HARQ process number 0 may be performed in the subframe n+4. Then, after performing transmission of the PUSCH in the subframe n+4, the terminal apparatus 1 may attempt to receive the PHICH for the PUSCH, in a subframe n+8. In addition, due to the occurrence of a measurement gap, the non-adaptive retransmission of the transport block on the PUSCH in the subframe n+4 is not performed in some cases. For example, in a case that the subframe n+4 in which the non-adaptive retransmission of the transport block corresponding to the HARQ process number 0 is attempted to be performed is a part of the measurement gap configured to a higher layer, the terminal apparatus 1 does not perform the non-adaptive retransmission of the transport block in the subframe n+4. Subsequently, the terminal apparatus 1 need not attempt to receive the PHICH in the subframe n+8, and may continuously perform the non-adaptive retransmission of the transport block corresponding to the HARQ process number 0 in a subframe n+12.

The measurement gap is a time interval for the terminal apparatus 1 to perform measurements of cells operating on different frequencies and/or operating in different Radio Access Technologies (RATs). The base station apparatus 3 transmits information indicating the period of the measurement gap to the terminal apparatus 1. The terminal apparatus 1 configures the period of the measurement gap, based on the information. The terminal apparatus 1 need not perform uplink transmission in a subframe that is a part of the measurement gap.

Figure 8:
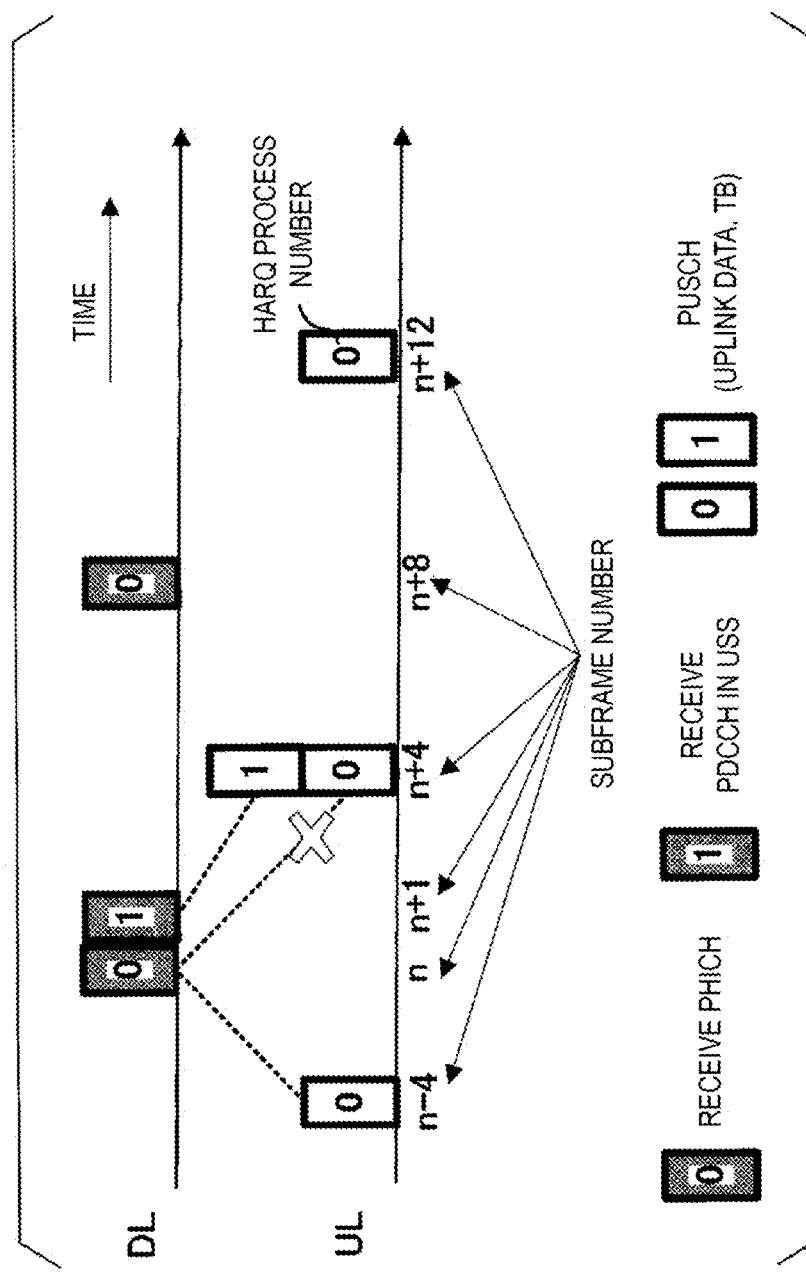
FIG. 8 is a diagram illustrating an example of a collision of PUSCH transmission due to different processing time according to the present embodiment.

FIG. 8 is a diagram illustrating an example of a collision of the PUSCH transmission due to different processing time according to the present embodiment. Hereinafter, in FIG. 8, the terminal apparatus 1 is a terminal apparatus with the shortening processing capability, and the RRC parameter shortProcessingTime is configured for the serving cell, unless otherwise specified. In FIG. 8, numbers in rectangles indicate the numbers of corresponding HARQ processes. One subframe corresponds to one HARQ process. One subframe corresponds to one TTI. In FIG. 8, the type of the uplink HARQ process may be determined based on the type of the search space in which the uplink grant is transmitted. For example, in a case that the uplink grant is received in the UE-specific search space, the asynchronous HARQ may be applied to the HARQ process corresponding to the PUSCH scheduled by the uplink grant. The terminal apparatus 1 may perform transmission of the PUSCH in a third succeeding subframe from the subframe in which the uplink grant has been received. The HARQ entity derives the HARQ process number from the "HARQ process number" field included in the uplink grant. Furthermore, in a case that the uplink grant is received in the common search space, the synchronous HARQ may be applied to the HARQ process corresponding to the PUSCH scheduled by the uplink grant. The terminal apparatus 1 may perform transmission of the PUSCH in a fourth succeeding subframe from the subframe in which the uplink grant has been received. The HARQ entity may derive the HARQ process number based at least on the subframe number at which the PUSCH is transmitted.

In FIG. 8, in the subframe n−4, the terminal apparatus 1 transmits the transport block corresponding to the HARQ process to which the synchronous HARQ is applied, on the PUSCH. In the HARQ process to which the uplink synchronous HARQ is applied, the HARQ indicator is transmitted on the PHICH in response to transmission of the transport block. Furthermore, the correspondence between the subframe in which the PHICH including the HARQ indicator is transmitted in response to the transmission of the transport block and the subframe in which the transport block has been transmitted is predetermined. The terminal apparatus 1 attempts to receive the PHICH including the HARQ indicator for the transmission of the transport block in the fourth succeeding subframe from the subframe in which the transport block has been transmitted on the PUSCH. Similarly, the terminal apparatus 1 may perform the non-adaptive retransmission of the transport block in a fourth succeeding subframe from the subframe in which the HARQ indicator indicating the NACK has been received on PHICH. In FIG. 8, the terminal apparatus 1 may attempt to receive the HARQ indicator for the transport block transmitted on the PUSCH of the subframe n−4, on the PHICH in the subframe n. In a case that the HARQ indicator indicating the NACK is received on the PHICH in the subframe n, the terminal apparatus 1 performs the non-adaptive retransmission of the transport block in the subframe n+4. Here, in FIG. 8, the HARQ process number, to which the synchronous HARQ is applied, corresponding to the transport block transmitted on the PUSCH in the subframe n−4 corresponds to 0. In a case that the terminal apparatus 1 detects the uplink grant indicating the same HARQ process (HARQ process number 0) in the subframe n, the terminal apparatus 1 may perform any one of an initial transmission or an adaptive retransmission of the transport block corresponding to the HARQ process number 0, based on the detected uplink grant, irrespective of the HARQ indicator received on the PHICH. In other words, in a case that the uplink grant is indicated for the HARQ process of the number 0 and the subframe n, the HARQ entity may instruct the HARQ process of the number 0 to generate any one of an initial transmission and an adaptive retransmission. In other words, in a case that the uplink grant is not indicated for the HARQ process of the number 0 and the subframe n, the HARQ entity may instruct the HARQ process of the number 0 to generate a non-adaptive retransmission.

Next, in a subframe n+1, in a case that the uplink grant is detected in the UE-specific search space, the terminal apparatus 1 may perform transmission of the transport block scheduled by the uplink grant on the PUSCH of the subframe n+4. As described above, in a case that the uplink grant for scheduling the transmission of the transport block is detected in the UE-specific search space, the transmission timing of the transport block may be configured to 3 ms (three subframes). In addition, the asynchronous HARQ may be applied to the HARQ process corresponding to the transport block. The HARQ process number corresponding to the transport block is provided based on the "HARQ process number" field included in the uplink grant. For example, in FIG. 8, the transmission of the transport block scheduled by the uplink grant corresponds to the HARQ process number 1. In other words, in FIG. 8, the transmission of the transport block requested by the HARQ indicator indicating the NACK and the transmission of the transport block scheduled by the uplink grant correspond to different HARQ processes.

As illustrated in FIG. 8, the transmission of the transport block requested by the HARQ indicator indicating the NACK and the transmission of the transport block scheduled by the uplink grant occur in the same subframe. The uplink grant may be an uplink grant scheduled so as to use the short processing time. However, there is a possibility that the terminal apparatus 1 cannot perform simultaneous transmission in the same subframe. In other words, the MAC entity may receive the uplink grant scheduled so as to use the short processing time. In a case that a transmission of the HARQ process (transport block) scheduled in the uplink grant and a non-adaptive retransmission of another HARQ process occur in the same subframe, the MAC entity need not drop the uplink grant. In other words, in this case, the MAC entity may select to continue the uplink grant.

Hereinafter, an example in which the uplink transmission is efficiently performed in a case that an uplink transmission collision occurs as illustrated in FIG. 8 in the present embodiment will be described.

Hereinafter, the transmission of the PUSCH including the transport block corresponding to a first HARQ process is a non-adaptive retransmission requested by the HARQ indicator indicating NACK, and may be performed in the subframe n+4, based at least on detection of the transmission of the PHICH in the subframe n. The transmission of the transport block corresponding to a second HARQ process may be scheduled by the uplink grant in the UE-specific search space. The uplink grant may be an uplink grant scheduled so as to use the short processing time. Note that the first HARQ process and the second HARQ process may correspond to different numbers of the HARQ processes.

The first HARQ process may be a HARQ process corresponding to the synchronous HARQ. The first HARQ process may be a HARQ process scheduled so as to use the normal processing time. The first HARQ process may be a HARQ process not scheduled so as to use the short processing time. The second HARQ process may be a HARQ process corresponding to the asynchronous HARQ process. The second HARQ process may be a HARQ process scheduled so as to use the short processing time.

In one aspect of the present embodiment, the terminal apparatus 1 may determine whether or not to attempt to receive the PHICH in the subframe n+8, based at least on an event in which the transmission of the transport block corresponding to the first HARQ process is stopped (not transmitted) in the subframe n+4. Here, the event in which the transmission of the transport block corresponding to the first HARQ process is stopped (not transmitted) in the subframe n+4 may include an event (i) occurrence of the measurement gap in the subframe n+4, and an event (ii) occurrence of the transmission of the transport block corresponding to the second HARQ process in the same subframe (subframe n+4). Note that the second HARQ process is a different HARQ process from the first HARQ process.

For example, in a case that the transmission of the transport block corresponding to the first HARQ process is stopped (no transmission) in the subframe n+4 by the event (i) occurrence of the measurement gap, the terminal apparatus 1 may perform transmission of the transport block corresponding to the first HARQ process in the subframe n+12 without attempting to receive the PHICH in the subframe n+8. In a case that the transmission of the transport block corresponding to the first HARQ process overlaps with the measurement gap configured in the higher layer, the terminal apparatus 1 need not perform transmission of the transport block corresponding to the first HARQ process in the subframe n+12 without attempting to receive the PHICH in the subframe n+8.

Furthermore, for example, in a case that the transmission of the transport block corresponding to the first HARQ process is stopped (no transmission) by the event (ii) occurrence of the transmission of the transport block scheduled by the uplink grant in the same subframe (subframe n+4), the terminal apparatus 1 may attempt to receive the PHICH in the subframe n+8. The terminal apparatus 1 may determine whether or not to perform the transmission of the transport block corresponding to the first HARQ process, based on the HARQ indicator included in the received PHICH.

In other words, in a case that the transmission of the transport block corresponding to the first HARQ process and the transmission of the transport block corresponding to the second HARQ process occur in the same subframe, the terminal apparatus 1 may perform the transmission of the transport block corresponding to the second HARQ process on the PUSCH of the subframe, may stop the transmission of the transport block corresponding to the first HARQ process using the PUSCH of the subframe, may attempt to receive the PHICH in a fourth succeeding subframe from the subframe, and/or may monitor the PDCCH (uplink grant) for the first HARQ process. The terminal apparatus 1 may determine whether or not to perform the transmission of the transport block corresponding to the first HARQ process, based at least on the HARQ indicator included in the PHICH and/or the uplink grant. Note that in FIG. 8, the first HARQ process corresponds to the HARQ process number 0. The second HARQ process corresponds to the HARQ process number 1. The terminal apparatus 1 may perform the transmission of the transport blocks corresponding to the HARQ process of the number 1 scheduled by the uplink grant in the subframe n+4, and may stop the non-adaptive retransmission of the transport block corresponding to the HARQ process of the number 0 requested by the NACK. Next, the terminal apparatus 1 may attempt to receive the PHICH including the HARQ indicator in response to the transmission of the transport block corresponding to the HARQ process of the number 0 in the subframe n+8. The PHICH in the subframe n+8 may be used to transmit the HARQ indicator indicating the ACK or NACK for the transmission of the transport block corresponding to the HARQ process of the number 0 on the PUSCH in the subframe n−4.

In addition, in a case that the ACK is decoded on the PHICH in the subframe n+8, the non-adaptive retransmission of the transport block corresponding to the HARQ process of the number 0 need not be performed in the subframe n+12. The ACK for the transport block corresponding to the HARQ process of the number 0 may be delivered to the higher layer. The retransmission or initial transmission of the transport block corresponding to the HARQ process of the number 0 is scheduled via the PDCCH. In addition, in a case that the NACK is decoded on the PHICH in the subframe n+8, the non-adaptive retransmission of the transport block corresponding to the HARQ process of the number 0 may be performed in the subframe n+12. This makes it possible to efficiently perform the transmission of the transport blocks corresponding to the HARQ processes respectively having different two numbers.

In addition, as an example, in FIG. 8, in a case that the transmission of the transport block scheduled by the uplink grant and the non-adaptive retransmission of the transport block requested by the NACK occur in the same subframe n+4, the terminal apparatus 1 may, in the subframe n+4, perform the transmission of the transport block scheduled by the uplink grant and stop the non-adaptive retransmission of the transport block corresponding to the HARQ process of the number 0 requested by the NACK, need not attempt to receive the PHICH in the subframe n+8, may monitor the uplink grant for the HARQ process of the number 0 in the subframe n+8, or need not perform the non-adaptive retransmission of the transport block corresponding to the HARQ process of the number 0 in the subframe n+12.

In another aspect of the present embodiment, the terminal apparatus 1 may determine whether or not to set the ACK to the state variable HARQ_FEEDBACK of the first HARQ process, based at least on an event in which the transmission of the transport block corresponding to the first HARQ process is stopped (not transmitted) in the subframe n+4.

For example, in a case that the transmission of the transport block corresponding to the first HARQ process is stopped (no transmission) in the subframe n+4 by (i) occurrence of the measurement gap, the terminal apparatus 1 need not set the ACK to the state variable HARQ_FEEDBACK of the first HARQ process. Additionally, in a case that the transmission of the transport block corresponding to the first HARQ process is stopped (no transmission) in the subframe n+4 by (i) occurrence of the measurement gap, the terminal apparatus 1 may perform the transmission (non-adaptive retransmission) of transport block corresponding to the first HARQ process in the subframe n+12.

Furthermore, for example, in a case that the transmission of the transport block corresponding to the first HARQ process is stopped (no transmission) by (ii) occurrence of the transmission of the transport block scheduled by the uplink grant in the same subframe (subframe n+4), the terminal apparatus 1 may set the ACK to the state variable HARQ_FEEDBACK of the first HARQ process. The initial transmission or the adaptive retransmission of the transport block corresponding to the first HARQ process is scheduled via the PDCCH. Here, the PDCCH includes the uplink grant mapped to the common search space.

Here, in a case that the transmission of the transport block corresponding to the first HARQ process and the transmission of the transport block corresponding to the second HARQ process occur in the same subframe, the terminal apparatus 1 may set the ACK to the state variable HARQ_FEEDBACK of the first HARQ process, may stop the non-adaptive retransmission of the transport block corresponding to the first HARQ process on the PUSCH of the subframe, and may perform the transmission of the transport block corresponding to the second HARQ process on the PUSCH of the subframe. Here, the ACK for the transport block corresponding to the first HARQ process may be delivered to the higher layer. In this case, the terminal apparatus 1 need not attempt to receive the PHICH in the subframe n+8, and need not perform the non-adaptive retransmission of the transport block corresponding to the first HARQ process in the subframe n+12.

In other words, in FIG. 8, in a case that the NACK is decoded on the PHICH in the subframe n, the terminal apparatus 1 sets NACK to the state variable HARQ_FEEDBACK of the first HARQ process of the number 0. The terminal apparatus 1 attempts to perform the non-adaptive retransmission of the transport block corresponding to the first HARQ process requested by the NACK in the subframe n+4 using the normal processing time. At this time, in a case that the terminal apparatus 1 detects, in the subframe n+1, the uplink grant corresponding to the second HARQ process of the number 1 in the UE-specific search space, the terminal apparatus 1 performs, in some cases, transmission of the transport block scheduled by the uplink grant received in the UE-specific search space in the subframe n+4 using the short processing time. In such a case, the transmission of the transport block corresponding to the first HARQ process of the number 0 and the transmission of the transport block corresponding to the second HARQ process of the number 1 may occur in the same subframe n+4. In this case, the terminal apparatus 1 may set the ACK to the state variable HARQ_FEEDBACK of the first HARQ process of the number 0. The initial transmission or the adaptive retransmission of the transport block corresponding to the first HARQ process of the number 0 is scheduled (indicated) via the PDCCH. That is, the non-adaptive retransmission of the transport block corresponding to the first HARQ process of the number 0 need not be performed in the subframes n+4 and n+12. This makes it possible to efficiently perform the transmission of the transport blocks corresponding to the HARQ processes respectively having different two numbers.

Figure 9:
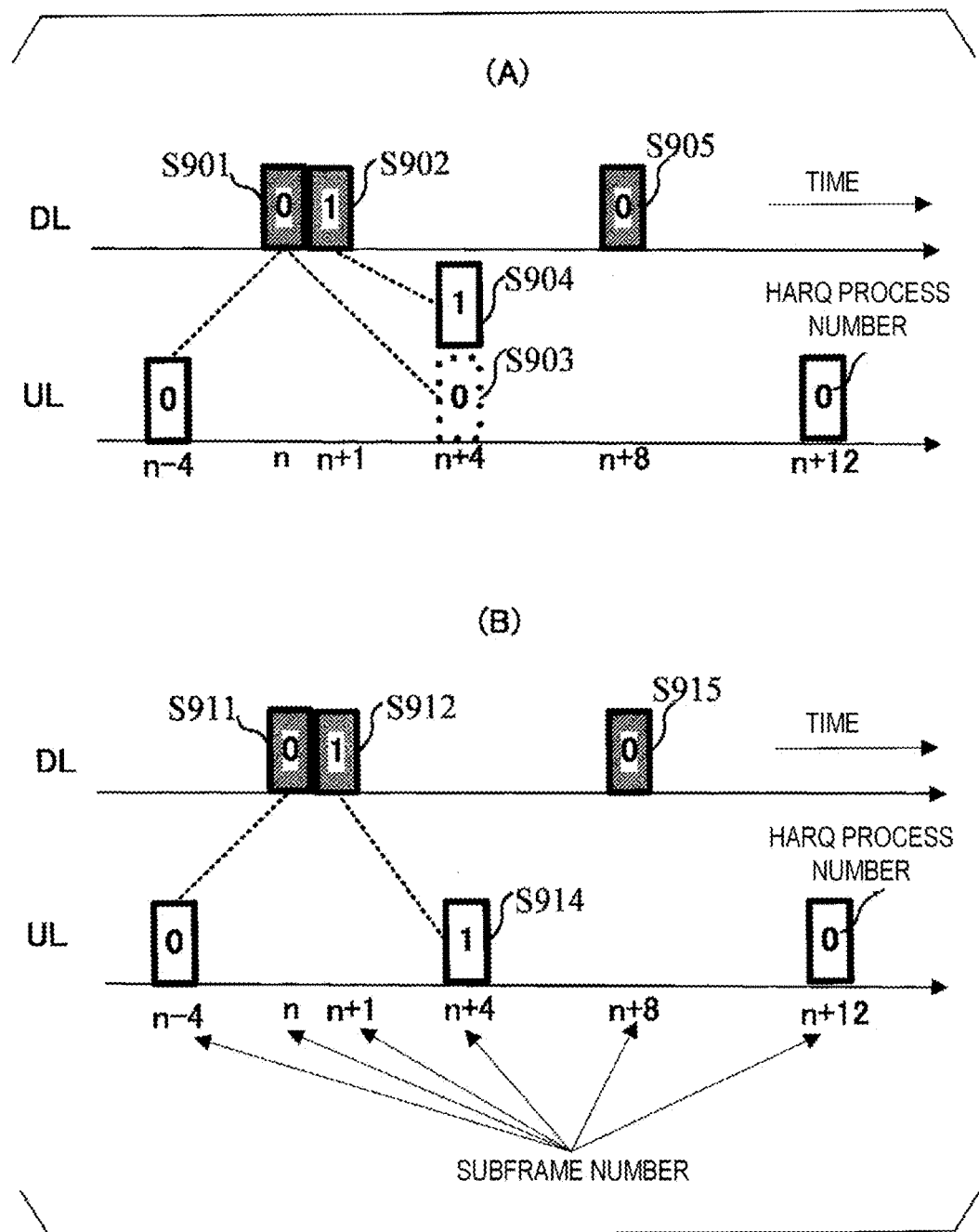
FIG. 9 is a diagram illustrating another example in which a state variable HARQ_FEEDBACK of a HARQ process is set to an ACK according to the present embodiment.

FIG. 9 is a diagram illustrating another example in which the state variable HARQ_FEEDBACK of the HARQ process is set to the ACK according to the present embodiment.

In the subframe n, the terminal apparatus 1 attempts to receive the PHICH including the HARQ indicator for the transmission of the transport block on the PUSCH of the subframe n−4. For each TTI, the HARQ entity identifies the HARQ process associated with the TTI.

(S901) For a first TTI (subframe n), the HARQ entity identifies the HARQ process associated with the first TTI as the first HARQ process. In a case that the uplink grant is not indicated for the first HARQ process and the first TTI, and the HARQ buffer of the first HARQ process is not empty, the HARQ entity indicates (requests) to the first HARQ process to generate a non-adaptive retransmission. In a case that the uplink grant is not indicated for the first HARQ process and the first TTI, and the HARQ buffer of the first HARQ process is empty, the HARQ entity need not indicate (request) to the first HARQ process to generate a non-adaptive retransmission. Subsequently, in a case that a HARQ feedback for the transport block corresponding to the first HARQ process is received, the first HARQ process may be set to HARQ_FEEDBACK is to a received value. Here, in a case that the HARQ feedback receives the NACK delivered from the physical layer, the first HARQ process may set HARQ_FEEDBACK to the NACK. In other words, in a case that the HARQ entity requests a non-adaptive retransmission to the first HARQ process for the first TTI, and HARQ_FEED- BACK of the first HARQ process is a NACK, the first HARQ process generates a non-adaptive retransmission. Here, the transmission of the first HARQ process is a non-adaptive retransmission. The first HARQ process may indicate to the physical layer to generate a transmission. In other words, the non-adaptive retransmission of the first HARQ process may be performed in the subframe n+4.

(S902) For a second TTI (subframe n+1), the HARQ entity identifies the HARQ process associated with the second TTI as the second HARQ process. The second HARQ process is scheduled so as to use the short processing time (ShortProcessingTime). In a case that the uplink grant is indicated for the second HARQ process and the second TTI, the HARQ entity indicates to the second HARQ process to generate any one of an initial transmission and an adaptive retransmission. In other words, the second HARQ process scheduled so as to use the short processing time generates any one of an initial transmission and an adaptive retransmission. The second HARQ process may instruct the physical layer to generate a transmission. In other words, the transmission of the second HARQ process is performed in the subframe n+4.

Subsequently, the terminal apparatus 1 may perform Operation A. Operation A includes at least one of Operation A1 and Operation A2. (Operation A1) In a case that Condition A, Condition B, and Condition C are satisfied, the HARQ entity may indicate to the first HARQ process to set the state variable HARQ_FEEDBACK to the ACK. (Operation A2) In a case that Condition A, Condition B, and Condition C are satisfied, the first HARQ process may set the state variable HARQ_FEEDBACK to the ACK, at a point of time when the HARQ feedback for responding to the transmission of the first HARQ process is received. In Operation A1, the first HARQ process sets the state variable HARQ_FEEDBACK to the ACK, based on the indication from the HARQ entity. In Operation A2, in a case that the above conditions are satisfied, the second HARQ process sets the state variable HARQ_FEEDBACK to the ACK, which is not based on the indication from the HARQ entity. The above conditions will be described below. (Operation A2) In the case that Condition A, Condition B, and Condition C are satisfied, the first HARQ process may set the state variable HARQ_FEEDBACK to the ACK.

In Operation A1, HARQ_FEEDBACK of the first HARQ process may be set to the ACK after receiving an indication from the HARQ entity. In other words, in FIG. 9(A), at a point of time when HARQ_FEEDBACK of the first HARQ process is set to the ACK, the subframe may be the subframe n+1, or may be any of subframes subsequent to the subframe n+1.

In Operation A2, HARQ_FEEDBACK of the first HARQ process is set to the ACK, at a point of time when the HARQ feedback for responding to the transmission of the first HARQ process is received. In other words, in FIG. 9(A), a point of time when HARQ_FEEDBACK of the first HARQ process is set to the ACK is the subframe n+8.

Condition A is a condition that the HARQ process (first HARQ process) corresponds to the synchronous HARQ. Condition B is a condition that the transmission of the HARQ process (first HARQ process) is a non-adaptive retransmission, and the transmission occurs (collides) in the same transmission time as a transmission of another HARQ process (second HARQ process). Condition C is a condition that another HARQ process (second HARQ process) is scheduled so as to use the short processing time (ShortProcessingTime).

(S903) The terminal apparatus 1 need not perform the non-adaptive retransmission of the transport block corresponding to the first HARQ process, on the PUSCH of the subframe.

(S904) The terminal apparatus 1 may perform the transmission of the transport block corresponding to the second HARQ process, on the PUSCH of the subframe.

(S905) For a third TTI (subframe n+8), the HARQ entity identifies the HARQ process associated with the third TTI as the first HARQ process. In other words, in the synchronous HARQ, the HARQ entity identifies the HARQ process associated with the first TTI and the HARQ process associated with the third TTI as the same HARQ process (first HARQ process). The terminal apparatus 1 may monitor the first HARQ process and the uplink grant for the third TTI in the subframe n+8.

Subsequently, the terminal apparatus 1 may perform Operation B. Operation B includes at least one of Operation B1 and Operation B2. (Operation B1) In a case that the uplink grant is not indicated for the first HARQ process and the third TTI, and that the HARQ buffer of the first HARQ process is not empty, and that the non-adaptive retransmission generated in the last first HARQ process and the transmission of the second HARQ process occur (collide) in the same uplink TTI (subframe n+4), the HARQ entity indicates to the first HARQ process to set the state variable HARQ_FEEDBACK to the ACK. (Operation B2) In a case that the uplink grant is not indicated for the first HARQ process and the third TTI, and the HARQ buffer of the first HARQ process is not empty, the HARQ entity indicates (requests) to the first HARQ process to generate a non-adaptive retransmission. In a case that the HARQ entity requests a non-adaptive retransmission to the first HARQ process for the third TTI, and the non-adaptive retransmission generated in the last first HARQ process and the transmission of the second HARQ process occur in the same uplink TTI, the first HARQ process may set the state variable HARQ_FEEDBACK to the ACK. Here, in Operation B1 and Operation B2, the non-adaptive retransmission generated in the last first HARQ process is a non-adaptive retransmission generated for the first TTI in (S901).

In (S905), in a case that the HARQ entity requests a non-adaptive retransmission to the first HARQ process for the third TTI, and the state variable HARQ_FEEDBACK of the first HARQ process is an ACK, the first HARQ process need not generate the non-adaptive retransmission requested by the HARQ entity. In other words, in a case that the HARQ entity requests a non-adaptive retransmission to the first HARQ process for the third TTI, and the state variable HARQ_FEEDBACK of the first HARQ process is a NACK, the first HARQ process may generate the non-adaptive retransmission requested by the HARQ entity. In a case that the state variable HARQ_FEEDBACK of the first HARQ process is set to the ACK, the non-adaptive retransmission of the first HARQ process can be stopped.

In (S905), in a case that the uplink grant is indicated for the first HARQ process and the third TTI, the first HARQ process instructs the physical layer to generate any one of an initial transmission and an adaptive retransmission, in response to the uplink grant.

In the present embodiment, whether Operation A or Operation B is performed may be configured by higher layer signaling, a specification, or the like. In a case that performance of Operation A is configured, whether Operation A1 or Operation A2 is performed may be configured by higher layer signaling, a specification, or the like. In a case that performance of Operation B is configured, whether Operation B1 or Operation B2 is performed may be configured by higher layer signaling, a specification, or the like.

This makes it possible to efficiently perform the transmission of the first HARQ process, in a case that transmissions of the HARQ processes having different two numbers collide with each other. In other words, the transmission of the first HARQ process can be efficiently performed based on the control of the base station apparatus 3.

Here, FIG. 9(B) is a diagram illustrating another example of collision of the PUSCH transmission according to the present embodiment.

(S911) and (S912) in FIG. 9(B) are similar to (S901) and (S902) in FIG. 9(A), and thus description thereof will be omitted.

The terminal apparatus 1 may perform Operation C after performing (S912).

In Operation C, in a case that the first HARQ process is a synchronous HARQ, and that the transmission of the first HARQ process is a non-adaptive retransmission, and that the transmission does not occur (collide) in the same transmission time as a transmission of another HARQ process (second HARQ process), the terminal apparatus 1 may perform Process A and Process B, and need not perform Process C. In a case that the first HARQ process is a synchronous HARQ, and the transmission of the first HARQ process is an adaptive retransmission, the terminal apparatus 1 may perform Process A and Process B, and need not perform Process C. In a case that the first HARQ process is a synchronous HARQ, and that the transmission of the first HARQ process is an initial transmission, the terminal apparatus 1 may perform Process A and Process B, and need not perform Process C. In a case that the first HARQ process is an asynchronous HARQ, the terminal apparatus 1 may perform Process A and Process B, and need not perform Process C.

In other words, in a case that the first HARQ process is a synchronous HARQ, and that the transmission of the first HARQ process is a non-adaptive retransmission, and that the transmission occurs (collides) in the same transmission time as a transmission of another HARQ process (second HARQ process), the terminal apparatus 1 need not perform Process A and Process B, and may perform Process C. In other words, the first HARQ process may determine whether or not to set HARQ_FEEDBACK to the ACK at a point of time when the HARQ feedback for responding to the transmission of the first HARQ process is received, based at least on (Condition A) whether the first HARQ process is a synchronous HARQ or an asynchronous HARQ, and/or (Condition B) in a case that the transmission of the first HARQ process is a non-adaptive retransmission, whether or not the transmission occurs (collides) in the same transmission time as a transmission of another HARQ process (second HARQ process). The first HARQ process may determine whether or not to set HARQ_FEEDBACK to the ACK, based at least on (Condition A) whether the first HARQ process is a synchronous HARQ or an asynchronous HARQ, and/or (Condition B) in a case that the transmission of the first HARQ process is a non-adaptive retransmission, whether or not the transmission occurs (collides) in the same transmission time as a transmission of another HARQ process (second HARQ process). Here, it is that another HARQ process (second HARQ process) is scheduled so as to use the short processing time (ShortProcessingTime).

Process A is a process of regarding that the first HARQ process indicates to the physical layer to generate a transmission, based on a stored uplink grant. In Process A, a redundancy version of the uplink grant corresponds to a value of a variable CURRENT_IRV. The sequence of the redundancy version is 0, 2, 3, 1. The variable CURRENT_IRV is an index for the sequence of the redundancy version. The variable is updated modulo 4.

Process B is a process of regarding that the first HARQ process increments CURRENT_IRV by one.

Process C is a process of regarding that the first HARQ process sets HARQ_FEEDBACK to the ACK at a point of time when the HARQ feedback for responding to the transmission of the first HARQ process is received. Process C may be a process of regarding that the first HARQ process sets HARQ_FEEDBACK to the ACK.

In FIG. 9(B), in a case that the transmission of the first HARQ process occurs (collides) in the same transmission time (subframe n+4) as the transmission of the second HARQ process, the first HARQ process need not indicate to the physical layer to generate a transmission. In other words, in a case that the transmission of the first HARQ process occurs (collides) in the same transmission time (subframe n+4) as the transmission of the second HARQ process, the second HARQ process may indicate to the physical layer to generate a transmission, based on the stored uplink grant.

In other words, the HARQ process of the terminal apparatus 1 may determine whether or not to instruct the physical layer to generate a transmission of the HARQ process, based at least on (I) whether the HARQ process is a synchronous HARQ or an asynchronous HARQ, (II) whether the transmission of the HARQ process is an initial transmission, the adaptive retransmission, or the non-adaptive retransmission, and (III) in a case that the transmission of the HARQ process is the non-adaptive retransmission, whether or not the transmission occurs (collides) in the same transmission time as the transmission of another HARQ process. In other words, the terminal apparatus 1 may determine whether or not to perform the transmission of the HARQ process on the PUSCH, based at least on (I) whether the HARQ process is a synchronous HARQ or an asynchronous HARQ, (II) whether the transmission of the HARQ process is an initial transmission, the adaptive retransmission, or the non-adaptive retransmission, and (III) in a case that the transmission of the HARQ process is the non-adaptive retransmission, whether or not the transmission occurs (collides) in the same transmission time as the transmission of another HARQ process.

In the present embodiment, the same transmission time may be interpreted as the same uplink TTI, and/or the same uplink subframe.

Hereinafter, an sTTI according to the present embodiment will be described.

Figure 10:
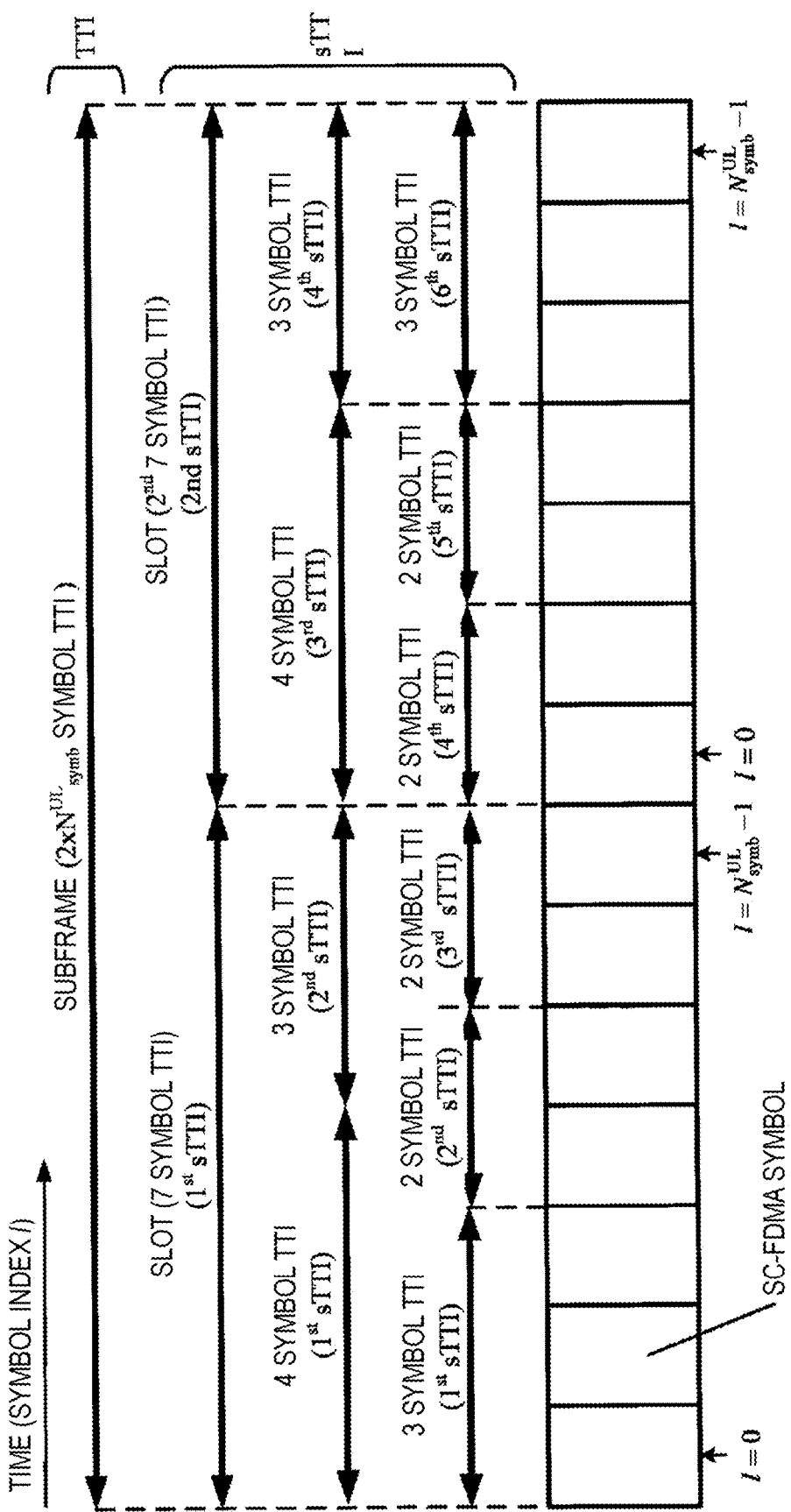
FIG. 10 is a diagram illustrating an example of a TTI and an sTTI according to the present embodiment.

FIG. 10 is a diagram illustrating an example of a TTI and an sTTI according to the present embodiment. The TTI may include $2 \times N^{UL}_{symb}$ SC-FDMA symbols. Note that $N^{UL}_{symb}$ may be the number of SC-FDMA symbols constituting one slot. In FIG. 10, the number X of SC-FDMA symbols constituting the sTTI (shortened TTI) is any one of {2, 3, 4, 7}. The TTI/sTTI including X SC-FDMA symbols is also referred to as an X-symbol TTI. In the uplink, an sPUSCH may be a channel used at least for transmission of the uplink data. An sPUCCH may be a channel used at least for transmission of the uplink control information. A TTI length of the sPUSCH and/or sPUCCH may be shorter than 1 ms (one subframe length) or 0.5 ms (one slot length). In a 2-symbol TTI, the sPUSCH and/or sPUCCH may be mapped to two SC-FDMA symbols or three SC-FDMA symbols. In a 7-symbol TTI, the sPUSCH and/or sPUCCH may be mapped to seven SC-FDMA symbols.

In the TTI, the transmission timing of the PUSCH for the uplink grant corresponds to the k-th succeeding subframe from the subframe in which the uplink grant has been detected. The value of k may be 3 and/or 4. Additionally, in the sTTI, the transmission timing of the sPUSCH for the uplink grant corresponds to an m-th succeeding sTTI from the sTTI in which the uplink grant has been detected. For example, in the 7-symbol TTI, the value of m may be 4. In other words, in the 7-symbol TTI, in a case that the uplink grant for scheduling the sPUSCH is received at a first sTTI in the subframe n, the transmission of the sPUSCH may be performed at the first sTTI in the subframe n+2. For example, in the 2-symbol TTI, the value of m may be 6. In other words, in the 2-symbol TTI, in a case that the uplink grant for scheduling the sPUSCH is received at the first sTTI in the subframe n, the transmission of the sPUSCH may be performed at the first sTTI in the subframe n+1. Furthermore, for example, in the 2-symbol TTI, the value of m may be 4. That is, the processing time of the sPUSCH is shorter than the processing time of the PUSCH.

Hereinafter, in the present embodiment, a case that the transmission of the transport block corresponding to the first HARQ process and the transmission of the sPUSCH occur in the same subframe will be described. Here, the transport block transmitted on the sPUSCH corresponds to a third HARQ process. That is, the transport block transmitted on the sPUSCH may be a different HARQ process from the first HARQ process. Note that the first HARQ process and the third HARQ process correspond to different HARQ process numbers. Here, the transmission of the transport block corresponding to the first HARQ process may be paraphrased as the transmission of the PUSCH corresponding to the first HARQ process. Since the processing time from the detection of the uplink grant to the transmission of the sPUSCH is shorter than the processing time for the PUSCH, even in case that the uplink grant for scheduling the transmission of the sPUSCH is received at a later timing than that of the uplink grant for scheduling the transmission of the PUSCH, the sPUSCH is transmitted, in some cases, in the same subframe as the PUSCH.

In such a case, the transmission of the transport block corresponding to the first HARQ process may be, by an event (iii) occurrence of the transmission of the sPUSCH corresponding to the third HARQ process in the same subframe, stopped (need not be performed) in the subframe. In the present embodiment, an operation after the transmission of the transport block corresponding to the first HARQ process has been stopped by the event (iii) occurrence of the transmission of the sPUSCH corresponding to the third HARQ process in the same subframe may be the same as an operation after the transmission of the transport block corresponding to the first HARQ process has been stopped by the event (ii) occurrence of the transmission of the transport block corresponding to the second HARQ process in the same subframe. Whether or not to perform the operation as described above may be determined based on the capability information of the terminal apparatus 1. In other words, in the present embodiment, in a case that the transmission of the transport block corresponding to the first HARQ process is stopped due to a certain condition, the operation of the terminal apparatus 1 after the stop may be common (the same).

Additionally, the transmission of the transport block corresponding to the first HARQ process being stopped by the event (iii) occurrence of the transmission of the sPUSCH corresponding to the third HARQ process in the same subframe may at least include that (A) the transport block corresponding to the first HARQ process is not transmitted by all symbols of the PUSCH and/or (B) the transport block corresponding to the first HARQ process is not transmitted by part of the symbols of the PUSCH. In addition, in (B), the transport block corresponding to the first HARQ process need not be transmitted by a symbol overlapping with the sPUSCH. In addition, in (B), the transport block corresponding to the first HARQ process need not be transmitted by a slot overlapping with the sPUSCH.

Configurations of apparatuses according to the present embodiment will be described below.

Figure 11:
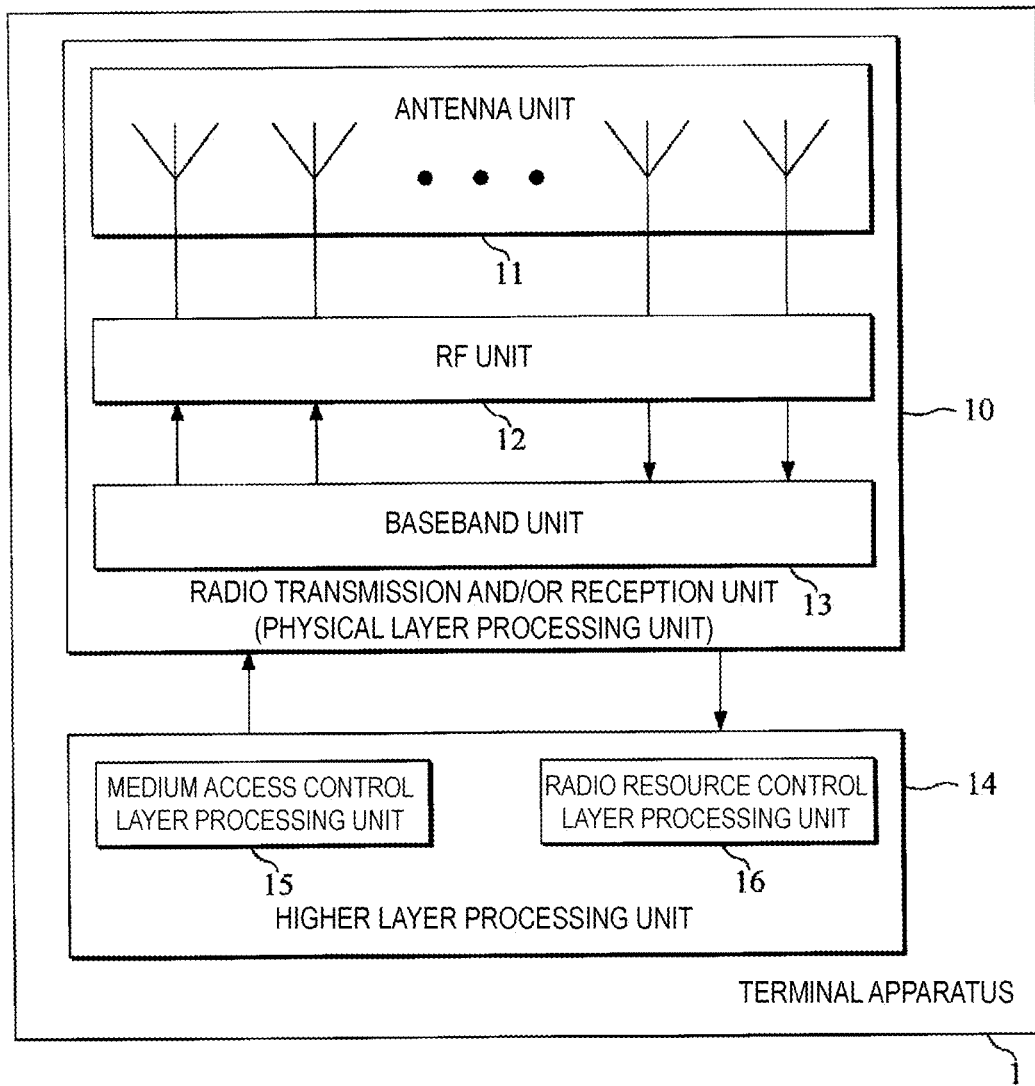
FIG. 11 is a schematic block diagram illustrating a configuration of a terminal apparatus 1 according to the present embodiment.

FIG. 11 is a schematic block diagram illustrating a configuration of the terminal apparatus 1 according to the present embodiment. As illustrated, the terminal apparatus 1 includes a radio transmission and/or reception unit 10 (physical layer processing unit 10) and a higher layer processing unit 14. The radio transmission and/or reception unit 10 includes an antenna unit 11, a Radio Frequency (RF) unit 12, and a baseband unit 13. The higher layer processing unit 14 includes a medium access control layer processing unit 15 and a radio resource control layer processing unit 16. The radio transmission and/or reception unit 10 is also referred to as a transmission unit, a reception unit or a physical layer processing unit. The physical layer processing unit performs processing associated with PUSCH transmission on the physical layer.

The higher layer processing unit 14 outputs uplink data (transport block) generated by a user operation or the like, to the radio transmission and/or reception unit 10. The higher layer processing unit 14 performs processing of the Medium Access Control (MAC) layer, a Packet Data Convergence Protocol (PDCP) layer, a Radio Link Control (RLC) layer, and the Radio Resource Control (RRC) layer.

The medium access control layer processing unit 15 included in the higher layer processing unit 14 performs processing of the Medium Access Control layer. The medium access control layer processing unit 15 controls HARQ, based on the various pieces of configuration information/parameters managed by the radio resource control layer processing unit 16. The medium access control layer processing unit 15 manages multiple HARQ entities, multiple HARQ processes, and multiple HARQ buffers. The HARQ entity manages multiple HARQ processes in parallel.

The medium access control layer processing unit 15 indicates to the radio transmission and/or reception unit 10 to monitor the PDCCH and or PHICH in the subframe. The monitoring of the PDCCH denotes an attempt to decode the PDCCH in accordance with a DCI format. The monitoring of the PHICH denotes an attempt to receive the PHICH including the HARQ indicator for transmission of a certain transport block. The HARQ process managed by the medium access control layer processing unit 15 sets the ACK or the NACK in the state variable HARQ_FEEDBACK, based on the HARQ indicator. The HARQ process managed by the medium access control layer processing unit 15 sets the ACK or the NACK in the state variable HARQ_FEEDBACK, based on the indication of the HARQ entity.

The radio resource control layer processing unit 16 included in the higher layer processing unit 14 performs processing of the Radio Resource Control layer. The radio resource control layer processing unit 16 manages various types of configuration information/parameters of its own apparatus. The radio resource control layer processing unit 16 sets the various pieces of configuration information/ parameters, based on RRC layer signaling received from the base station apparatus 3. Namely, the radio resource control layer processing unit 16 sets the various configuration information/parameters, based on the information indicating the various configuration information/parameters received from the base station apparatus 3.

The radio transmission and/or reception unit 10 performs processing of the physical layer, such as modulation, demodulation, coding, decoding, and the like. The radio transmission and/or reception unit 10 demultiplexes, demodulates, and decodes a signal received from the base station apparatus 3, and outputs the information resulting from the decoding to the higher layer processing unit 14. The radio transmission and/or reception unit 10 generates a transmit signal by modulating and coding data, and performs transmission to the base station apparatus 3. The physical layer processing unit performs processing associated with PUSCH transmission on the physical layer. The HARQ process managed by the medium access control layer processing unit 15 indicates to the physical layer processing unit to generate a transmission of the HARQ process. The physical layer processing unit performs processing associated with PUSCH transmission on the physical layer, based on the indication of the HARQ process.

The RF unit 12 converts (down-converts) a signal received via the antenna unit 11 into a baseband signal by orthogonal demodulation, and removes unnecessary frequency components. The RF unit 12 outputs the processed analog signal to the baseband unit.

The baseband unit 13 converts the analog signal input from the RF unit 12 into a digital signal. The baseband unit 13 removes a portion corresponding to a Cyclic Prefix (CP) from the digital signal resulting from the conversion, performs Fast Fourier Transform (FFT) of the signal from which the CP has been removed, and extracts a signal in the frequency domain.

The baseband unit 13 generates an SC-FDMA symbol by performing Inverse Fast Fourier Transform (IFFT) of the data, adds CP to the generated SC-FDMA symbol, generates a baseband digital signal, and converts the baseband digital signal into an analog signal. The baseband unit 13 outputs the analog signal resulting from the conversion, to the RF unit 12.

The RF unit 12 removes unnecessary frequency components from the analog signal input from the baseband unit 13 using a low-pass filter, up-converts the analog signal into a signal of a carrier frequency, and transmits the up-converted signal via the antenna unit 11. Furthermore, the RF unit 12 amplifies power. Furthermore, the RF unit 12 may have a function of controlling transmit power. The RF unit 12 is also referred to as a transmit power control unit.

Figure 12:
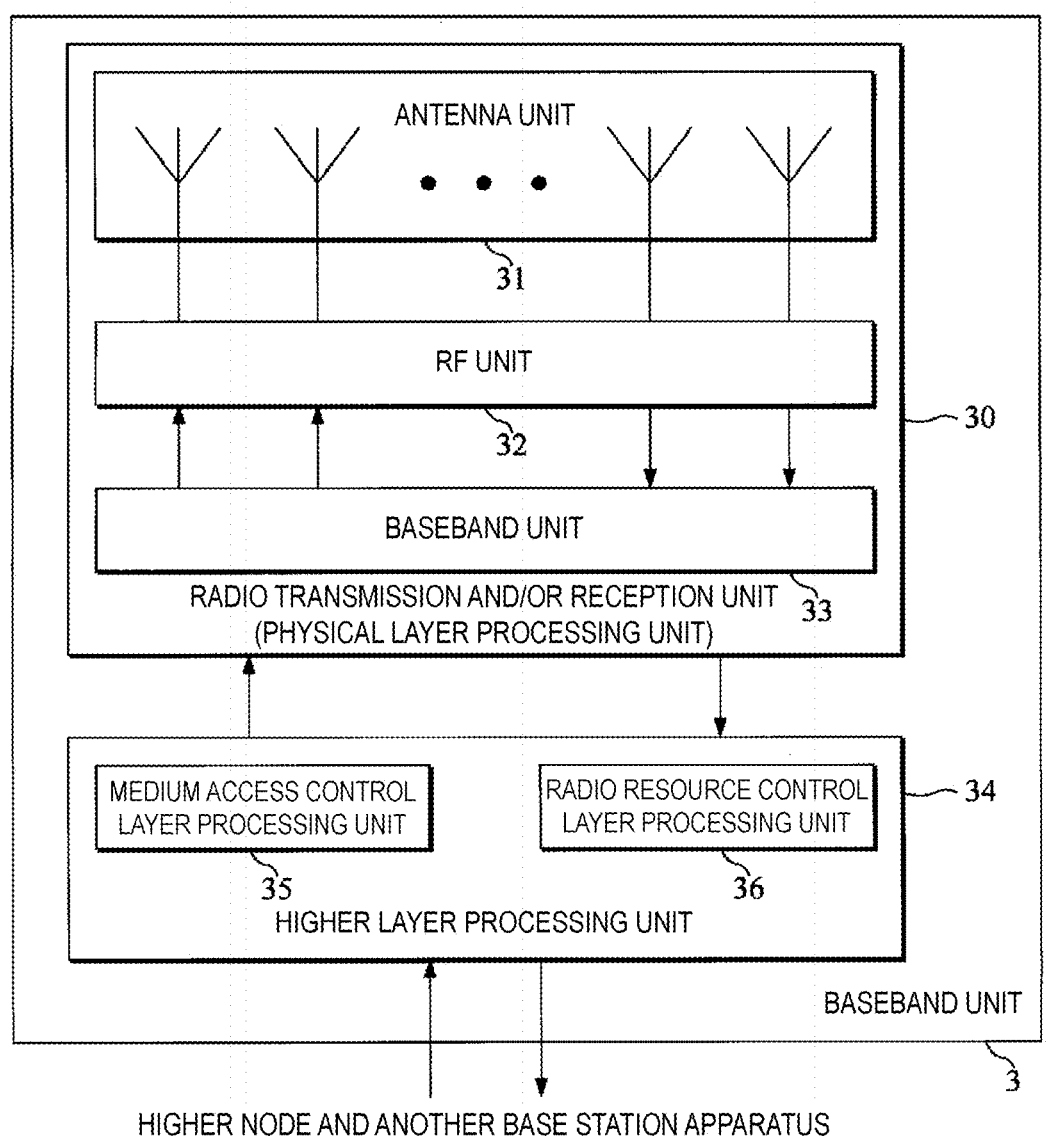
FIG. 12 is a schematic block diagram illustrating a configuration of a base station apparatus 3 according to the present embodiment.

FIG. 12 is a schematic block diagram illustrating a configuration of the base station apparatus 3 according to the present embodiment. As illustrated, the base station apparatus 3 includes a radio transmission and/or reception unit 30 and a higher layer processing unit 34. The radio transmission and/or reception unit 30 includes an antenna unit 31, an RF unit 32, and a baseband unit 33. The higher layer processing unit 34 includes a medium access control layer processing unit 35 and a radio resource control layer processing unit 36. The radio transmission and/or reception unit 30 is also referred to as a transmission unit, a reception unit or a physical layer processing unit.

The higher layer processing unit 34 performs processing of the Medium Access Control (MAC) layer, the Packet Data Convergence Protocol (PDCP) layer, the Radio Link Control (RLC) layer, and the Radio Resource Control (RRC) layer.

The medium access control layer processing unit 35 included in the higher layer processing unit 34 performs processing of the Medium Access Control layer. The medium access control layer processing unit 15 controls HARQ, based on the various pieces of configuration information/parameters managed by the radio resource control layer processing unit 16. The medium access control layer processing unit 15 generates an ACK/NACK and HARQ information with respect to uplink data (UL-SCH). The ACK/NACK and HARQ information with respect to the uplink data (UL-SCH) are transmitted to the terminal apparatus 1 on the PHICH or the PDCCH.

The radio resource control layer processing unit 36 included in the higher layer processing unit 34 performs processing of the Radio Resource Control layer. The radio resource control layer processing unit 36 generates, or acquires from a higher node, downlink data (transport block) allocated on a physical downlink shared channel, system information, an RRC message, a MAC Control Element (CE), and the like, and performs output to the radio transmission and/or reception unit 30. Furthermore, the radio resource control layer processing unit 36 manages various types of configuration information/parameters for each of the terminal apparatuses 1. The radio resource control layer processing unit 36 may set various types of configuration information/parameters for each of the terminal apparatuses 1 via the higher layer signal. That is, the radio resource control layer processing unit 36 transmits/broadcasts information indicating various types of configuration information/parameters.

The functionality of the radio transmission and/or reception unit 30 is similar to the functionality of the radio transmission and/or reception unit 10, and hence description thereof is omitted.

Each of the units having the reference signs 30 to 36 included in the base station apparatus 3 may be configured as a circuit. Each of the units having the reference signs 10 to 16 included in the terminal apparatus 1 may be configured as a circuit.

Hereinafter, various aspects of the terminal apparatus and the base station apparatus in the present embodiment will be described.

(1) A first aspect of the present embodiment is a terminal apparatus including: a medium access control layer processing unit 15 configured to manage a HARQ process; and a physical layer processing unit 10 configured to perform processing associated with a PUSCH transmission on a physical layer, wherein a first HARQ process determines whether or not to indicate to the physical layer processing unit to generate a transmission of the first HARQ process, based at least on whether or not the transmission of the first HARQ process and a transmission of a second HARQ process occur in the same transmission time, and the transmission of the second HARQ process is scheduled so as to use short processing time.

(2) A second aspect of the present embodiment is a terminal apparatus including a medium access control layer processing unit 15 configured to manage a HARQ process, wherein a first HARQ process may determine whether or not to set HARQ_FEEDBACK to an ACK at a point of time when receiving a HARQ feedback for responding to a transmission of the first HARQ process is received, based at least on (Condition A) whether the first HARQ process is a synchronous HARQ or an asynchronous HARQ, and/or (Condition B) in a case that the transmission of the first HARQ process is a non-adaptive retransmission, whether or not the transmission occurs (collides) in the same transmission time as a transmission of another HARQ process (second HARQ process).

(3) A third aspect of the present embodiment is a terminal apparatus including a medium access control layer processing unit 15 configured to manage a HARQ entity, wherein, in a case that an uplink grant is indicated for a second HARQ process and a first TTI, the second HARQ process is scheduled so as to use short processing time, and in a case that a transmission of the second HARQ process and a transmission of the first HARQ process occur in the same uplink TTI, the HARQ entity indicates to the first HARQ process to set a state variable HARQ_FEEDBACK to an ACK.

(4) A fourth aspect of the present embodiment is a terminal apparatus including a medium access control layer processing unit 15 configured to manage a HARQ entity, wherein, in a case that an uplink grant is not indicated for a first HARQ process and a second TTI, and a HARQ buffer of the first HARQ process is not empty, the HARQ entity indicates to the first HARQ process to generate a non-adaptive retransmission, and in a case that the non-adaptive retransmission generated in the last first HARQ process and a transmission of a second HARQ process occur in the same uplink TTI, the HARQ entity indicates to the first HARQ process to set a state variable HARQ_FEEDBACK to an ACK, and the transmission of the second HARQ process is scheduled so as to use short processing time.

(5) A fifth aspect of the present embodiment is a terminal apparatus including a medium access control layer processing unit 15 configured to manage a HARQ entity, wherein, in a case that the HARQ entity requests a non-adaptive retransmission from a first HARQ process for a second TTI, and the non-adaptive retransmission generated in the preceding first HARQ process and a transmission of a second HARQ process occur in the same uplink TTI, the first HARQ process sets a state variable HARQ_FEEDBACK to an ACK, and the transmission of the second HARQ process is scheduled so as to use short processing time.

(6) In the first, second, third, fourth, and fifth aspects of the present embodiment, for the second HARQ process scheduled so as to use the short processing time, for FDD, a UL HARQ RTT timer corresponding to the second HARQ process is set to three subframes.

(7) In the first, second, and third aspects of the present embodiment, the transmission of the first HARQ process is a non-adaptive retransmission.

(8) A sixth aspect of the present embodiment is a base station apparatus that communicates with a terminal apparatus, the base station apparatus including: a transmitter 30 configured to transmit a PDCCH including an uplink grant; and a receiver 30 configured to receive a transmission of a HARQ process on a PUSCH, wherein a first HARQ process configured for the terminal apparatus determines whether or not to indicate to the physical layer processing unit to generate a transmission of the first HARQ process, based at least on whether or not the transmission of the first HARQ process and a transmission of a second HARQ process occur in the same transmission time, and the transmission of the second HARQ process is scheduled so as to use short processing time.

(9) A seventh aspect of the present embodiment is a base station apparatus that communicates with a terminal apparatus, the base station apparatus including: a transmitter 30 configured to transmit a PDCCH including an uplink grant; and a receiver 30 configured to receive a transmission of a HARQ process on a PUSCH, wherein a first HARQ process configured for the terminal apparatus determines whether or not to indicate to the physical layer processing unit to generate a transmission of the first HARQ process, based at least on whether or not the transmission of the first HARQ process and a transmission of a second HARQ process occur in the same transmission time, and the transmission of the second HARQ process is scheduled so as to use short processing time.

(10) An eighth aspect of the present embodiment is a base station apparatus that communicates with a terminal apparatus, the base station apparatus including: a transmitter 30 configured to transmit a PDCCH including an uplink grant; and a receiver 30 configured to receive a transmission of a HARQ process on a PUSCH, wherein, in a case that the uplink grant is indicated for a second HARQ process and a first TTI, the second HARQ process is scheduled so as to use short processing time, and a transmission of the second HARQ process and a transmission of a first HARQ process occur in the same uplink TTI, a HARQ entity configured for the terminal apparatus indicates to the first HARQ process to set a state variable HARQ_FEEDBACK to an ACK.

(11) A ninth aspect of the present embodiment is a base station apparatus that communicates with a terminal apparatus, the base station apparatus including: a transmitter 30 configured to transmit a PDCCH including an uplink grant; and a receiver 30 configured to receive a transmission of a HARQ process on a PUSCH, wherein, in a case that the uplink grant is not indicated for a first HARQ process and a second TTI, and a HARQ buffer of the first HARQ process configured for the terminal apparatus is not empty, a HARQ entity configured for the terminal apparatus indicates to the first HARQ process to generate a non-adaptive retransmission, and in a case that the non-adaptive retransmission generated in the last first HARQ process and a transmission of a second HARQ process occur in the same uplink TTI, the HARQ entity configured for the terminal apparatus indicates to the first HARQ process to set a state variable HARQ_FEEDBACK to an ACK, and the transmission of the second HARQ process is scheduled so as to use short processing time.

(12) A tenth aspect of the present embodiment is a base station apparatus that communicates with a terminal apparatus, the base station apparatus including: a transmitter 30 configured to transmit a PDCCH including an uplink grant; and a receiver 30 configured to receive a transmission of a HARQ process on a PUSCH, wherein, in a case that a HARQ entity configured for the terminal apparatus requests a non-adaptive retransmission from a first HARQ process for a second TTI, and the non-adaptive retransmission generated in the last first HARQ process and a transmission of a second HARQ process occur in the same uplink TTI, the first HARQ process configured for the terminal apparatus sets a state variable HARQ_FEEDBACK to an ACK, and the transmission of the second HARQ process is scheduled so as to use short processing time.

(13) In the eighth, ninth, tenth, eleventh, and twelfth aspects of the present embodiment, for the second HARQ process scheduled using short processing time by the uplink grant, for FDD, a UL HARQ RTT timer corresponding to the second HARQ process is set to three subframes.

(14) In the eighth, ninth, and tenth aspects of the present embodiment, the transmission of the first HARQ process of the terminal apparatus is a non-adaptive retransmission.

Supplementary Note

Other aspects of the present embodiment will be described below. The HARQ information may include a HARQ feedback. For example, in FIG. 9(A), for the first TTI (subframe n), the HARQ entity identifies the HARQ process associated with the first TTI as the first HARQ process. For the second TTI (subframe n+1), the HARQ entity identifies the HARQ process associated with the second TTI as the second HARQ process. Here, the second HARQ process is scheduled so as to use the short processing time (ShortProcessingTime).

In a case that the uplink grant is not indicated for the first HARQ process and the first TTI, and the HARQ buffer of the first HARQ process is not empty, the HARQ entity may indicate (request) to the first HARQ process to generate a non-adaptive retransmission. In a case that the generated non-adaptive retransmission of the first HARQ process and the transmission of the second HARQ process occur (collide) in the same uplink TTI (the same transmission time, subframe n+4), the HARQ entity instructs the first HARQ process to set the state variable HARQ_FEEDBACK to the ACK. In other words, in a case that the uplink grant is not indicated for the first HARQ process and the first TTI, and that the HARQ buffer of the first HARQ process is not empty, and that the generated non-adaptive retransmission of the first HARQ process and the transmission of the second HARQ process occur (collide) in the same uplink TTI (subframe n+4), the HARQ entity indicates to the first HARQ process to set the state variable HARQ_FEEDBACK to the ACK.

Here, for the first TTI, even in a case that the HARQ feedback receives the NACK delivered from the physical layer, the first HARQ process may set HARQ_FEEDBACK to the ACK, based on the indication of the HARQ entity. For the first TTI, after the NACK received from the physical layer is set to HARQ_FEEDBACK, the first HARQ process may set HARQ_FEEDBACK to the ACK, based on the indication of the HARQ entity. For the first TTI, after the NACK received from the physical layer is set to HARQ_FEEDBACK, in a case that the uplink grant is not indicated for the first HARQ process and the first TTI, and that the HARQ buffer of the first HARQ process is not empty, and that the generated non-adaptive retransmission of the first HARQ process and the transmission of the second HARQ process occur (collide) in the same uplink TTI (subframe n+4), the first HARQ process may set HARQ_FEEDBACK to the ACK, based on the indication of the HARQ entity. In other words, in a case that the HARQ entity requests a non-adaptive retransmission from the first HARQ process for the first TTI, and the state variable HARQ_FEEDBACK of the first HARQ process is an ACK, the first HARQ process need not generate the non-adaptive retransmission requested by the HARQ entity.

In a case that the uplink grant is not indicated for the first HARQ process and the first TTI, and the HARQ buffer of the first HARQ process is not empty, the HARQ entity may indicate (request) to the first HARQ process to generate a non-adaptive retransmission. In a case that the generated non-adaptive retransmission of the first HARQ process and the transmission of the second HARQ process occur (collide) in the same uplink TTI (the same transmission time, subframe n+4), the HARQ entity may deliver the ACK to the first HARQ process as the received HARQ feedback. In other words, in a case that the uplink grant is not indicated for the first HARQ process and the first TTI, and that the HARQ buffer of the first HARQ process is not empty, and that the generated non-adaptive retransmission of the first HARQ process and the transmission of the second HARQ process occur (collide) in the same uplink TTI (subframe n+4), the HARQ entity may deliver the ACK to the first HARQ process as the received HARQ feedback.

Here, for the first TTI, even in a case that the HARQ feedback receives the NACK delivered from the physical layer, the HARQ entity may deliver the ACK to the first HARQ process. For the first TTI, the HARQ entity may deliver the ACK to the first HARQ process, irrespective of the HARQ feedback received from the physical layer. In other words, in a case that the uplink grant is not indicated for the first HARQ process and the first TTI, and that the HARQ buffer of the first HARQ process is not empty, and that the generated non-adaptive retransmission of the first HARQ process and the transmission of the second HARQ process occur (collide) in the same uplink TTI (subframe n+4), the HARQ entity may deliver the ACK to the first HARQ process, irrespective of the HARQ feedback received from the physical layer.

In FIG. 9(B), in a case that the first HARQ process obtains the MAC PDU from a message 3 buffer (Msg 3 buffer), the terminal apparatus 1 may perform Process A and Process B and need not perform Process C, irrespective of whether or not the transmission occurs (collides) in the same transmission time as a transmission of another HARQ process (second HARQ process). In other words, in a case that the first HARQ process is a synchronous HARQ, and that the transmission of the first HARQ process is a non-adaptive retransmission, and that the MAC PDU of the first HARQ process is not obtained from the message 3 buffer (Msg 3 buffer), and that the transmission does not occur (collide) in the same transmission time as a transmission of another HARQ process (second HARQ process), the terminal apparatus 1 may perform Process A and Process B, and need not perform Process C. In a case that the first HARQ process is a synchronous HARQ, and that the transmission of the first HARQ process is a non-adaptive retransmission, and that the MAC PDU of the first HARQ process is not obtained from the message 3 buffer (Msg 3 buffer), and that the transmission occurs (collides) in the same transmission time as a transmission of another HARQ process (second HARQ process), the terminal apparatus 1 need not perform Process A and Process B, and may perform Process C. In a case that the first HARQ process is a synchronous HARQ, that the transmission of the first HARQ process is a non-adaptive retransmission, that the MAC PDU of the first HARQ process is obtained from the message 3 buffer (Msg 3 buffer), and that the transmission occurs (collides) in the same transmission time as a transmission of another HARQ process (second HARQ process), the terminal apparatus 1 may perform Process A and Process B, and need not perform Process C. In a case that the first HARQ process is a synchronous HARQ, and that the transmission of the first HARQ process is a non-adaptive retransmission, and that the MAC PDU of the first HARQ process is obtained from the message 3 buffer (Msg 3 buffer), and that the transmission does not occur (collide) in the same transmission time as a transmission of another HARQ process (second HARQ process), the terminal apparatus 1 may perform Process A and Process B, and need not perform Process C.

In a random access procedure, in a case that a downlink assignment for the TTI is received on the PDCCH for a RA-RNTI and the received transport block is correctly decoded, and that a received random access response includes a random access preamble identifier corresponding to the transmitted random access preamble, the MAC entity regards that reception of the random access response succeeded. Subsequently, in a case that the random access preamble included in the random access response is selected by the MAC entity, and the random access response is a random access response first successfully received in the random access procedure, the MAC entity stores the MAC PDU in the message 3 buffer. Here, the random access procedure may be a contention based random access procedure. In other words, the message 3 buffer is a buffer used for the contention based random access procedure. Message 3 may be a transport block scheduled by the uplink grant included in the random access response.

(15) An eleventh aspect of the present embodiment is a terminal apparatus including a medium access control layer processing unit 15 configured to manage a HARQ entity, wherein, in a case that an uplink grant is not indicated for a first HARQ process and a first TTI, and a HARQ buffer of the first HARQ process is not empty, the HARQ entity indicates to the first HARQ process to generate a non-adaptive retransmission, and in a case that the generated non-adaptive retransmission of the first HARQ process and a transmission of a second HARQ process occur in the same uplink TTI, the HARQ entity indicates to the first HARQ process to set a state variable HARQ_FEEDBACK to an ACK, and the transmission of the second HARQ process is scheduled so as to use short processing time.

(16) A twelfth aspect of the present embodiment is a base station apparatus that communicates with a terminal apparatus, the base station apparatus including: a transmitter 30 configured to transmit a PDCCH including an uplink grant; and a receiver 30 configured to receive a transmission of a HARQ process on a PUSCH, wherein, in a case that the uplink grant is not indicated for a first HARQ process and a first TTI, and a HARQ buffer of the first HARQ process configured for the terminal apparatus is not empty, a HARQ entity configured for the terminal apparatus indicates to the first HARQ process to generate a non-adaptive retransmission, and in a case that the generated non-adaptive retransmission of the first HARQ process and a transmission of a second HARQ process occur in the same uplink TTI, the HARQ entity configured for the terminal apparatus indicates to the first HARQ process to set a state variable HARQ_FEEDBACK to an ACK, and the transmission of the second HARQ process is scheduled so as to use short processing time.

With this configuration, the terminal apparatus 1 is capable of efficiently communicating with the base station apparatus 3.

(1A) To accomplish the object described above, aspects of the present invention are contrived to provide the following measures. Specifically, a first aspect of the present invention is a terminal apparatus including: a medium access control layer processing unit configured to manage a HARQ process; and a physical layer processing unit configured to perform processing associated with a PUSCH transmission on a physical layer, wherein a first HARQ process determines whether or not to indicate to the physical layer processing unit to generate a transmission of the first HARQ process, based at least on whether or not the transmission of the first HARQ process and a transmission of a second HARQ process occur in the same transmission time, and the transmission of the second HARQ process is scheduled so as to use short processing time.

(2A) A second aspect of the present invention is a base station apparatus that communicates with a terminal apparatus, the base station apparatus including: a transmitter configured to transmit a PDCCH including an uplink grant; and a receiver configured to receive a transmission of a HARQ process on a PUSCH, wherein a first HARQ process configured for the terminal apparatus determines whether or not to indicate to the physical layer processing unit to generate a transmission of the first HARQ process, based at least on whether or not the transmission of the first HARQ process and a transmission of a second HARQ process occur in the same transmission time, and the transmission of the second HARQ process is scheduled so as to use short processing time.

(3A) A third aspect of the present invention is a communication method used for a terminal apparatus, the communication method including: a step of managing a HARQ process; a step of performing processing associated with a PUSCH transmission on a physical layer; and a step in which a first HARQ process determines whether or not to indicate to the physical layer processing unit to generate a transmission of the first HARQ process, based at least on whether or not the transmission of the first HARQ process and a transmission of a second HARQ process occur in the same transmission time, and the transmission of the second HARQ process is scheduled so as to use short processing time.

(4A) A fourth aspect of the present invention is a communication method used for a base station apparatus that communicates with a terminal apparatus, the communication method including: a transmission step of transmitting a PDCCH including an uplink grant; a reception step of receiving a transmission of a HARQ process on a PUSCH; and a step in which a first HARQ process configured for the terminal apparatus determines whether or not to indicate to the physical layer processing unit to generate a transmission of the first HARQ process, based at least on whether or not the transmission of the first HARQ process and a transmission of a second HARQ process occur in the same transmission time, and the transmission of the second HARQ process is scheduled so as to use short processing time.

(1B) To accomplish the object described above, aspects of the present invention are contrived to provide the following measures. Specifically, a first aspect of the present invention is a terminal apparatus including: a receiver configured to receive a physical downlink control channel (PDCCH) including an uplink grant; and a medium access control layer processing unit configured to manage a hybrid automatic repeat request (HARQ) entity, wherein the HARQ entity manages a first HARQ process and a second HARQ process in parallel, in a case that the uplink grant is not indicated for the first HARQ process and a transmission time interval (TTI) and a HARQ buffer of the first HARQ process is not empty, the HARQ entity indicates to the first HARQ process to generate a non-adaptive retransmission, and in a case that the non-adaptive retransmission of the first HARQ process collides with a transmission of the second HARQ process scheduled so as to use short processing time, the medium access control layer processing unit sets an ACK for a transport block in a state variable HARQ_FEEDBACK of the first HARQ process, based on an indication from the HARQ entity.

(2B) Based on the terminal apparatus according to the first aspect, in a second aspect of the present invention, for FDD, a physical uplink shared channel (PUSCH) transmission corresponding to the second HARQ process is performed in a third subsequent subframe from a subframe in which the uplink grant has been received.

(3B) A third aspect of the present invention is a base station apparatus including: a transmitter configured to transmit a physical downlink control channel (PDCCH) including an uplink grant; and a medium access control layer processing unit configured to manage a hybrid automatic repeat request (HARQ) entity, wherein the HARQ entity manages a first HARQ process and a second HARQ process in parallel, in a case that the uplink grant is not indicated for the first HARQ process and a transmission time interval (TTI) and a HARQ buffer of the first HARQ process is not empty, the HARQ entity indicates to the first HARQ process to generate a non-adaptive retransmission, and in a case that the non-adaptive retransmission of the first HARQ process collides with a transmission of the second HARQ process scheduled so as to use short processing time, the medium access control layer processing unit sets an ACK for a transport block in a state variable HARQ_FEEDBACK of the first HARQ process, based on an indication from the HARQ entity.

(4B) Based on the base station apparatus according to the third aspect, in a fourth aspect of the present invention, for FDD, a physical uplink shared channel (PUSCH) reception corresponding to the second HARQ process is performed in a third subsequent subframe from a subframe in which the uplink grant has been transmitted.

(5B) A fifth aspect of the present invention is a communication method used for a terminal apparatus, the communication method including: a reception step of receiving a physical downlink control channel (PDCCH) including an uplink grant; and a medium access control layer processing step of managing a hybrid automatic repeat request (HARQ) entity, wherein the HARQ entity manages a first HARQ process and a second HARQ process in parallel, in a case that the uplink grant is not indicated for the first HARQ process and a transmission time interval (TTI) and a HARQ buffer of the first HARQ process is not empty, the HARQ entity indicates to the first HARQ process to generate a non-adaptive retransmission, and in a case that the non-adaptive retransmission of the first HARQ process collides with a transmission of the second HARQ process scheduled so as to use short processing time, the medium access control layer processing unit sets an ACK for a transport block in a state variable HARQ_FEEDBACK of the first HARQ process, based on an indication from the HARQ entity.

(6B) Based on the communication method according to the fifth aspect, in a sixth aspect of the present invention, for FDD, a physical uplink shared channel (PUSCH) transmission corresponding to the second HARQ process is performed in a third subsequent subframe from a subframe in which the uplink grant has been received.

(7B) A seventh aspect of the present invention is a communication method used for a base station apparatus, the communication method including: a transmission step of transmitting a physical downlink control channel (PDCCH) including an uplink grant; and a medium access control layer processing step of managing a hybrid automatic repeat request (HARQ) entity, wherein the HARQ entity manages a first HARQ process and a second HARQ process in parallel, in a case that the uplink grant is not indicated for the first HARQ process and a transmission time interval (TTI) and a HARQ buffer of the first HARQ process is not empty, the HARQ entity indicates to the first HARQ process to generate a non-adaptive retransmission, and in a case that the non-adaptive retransmission of the first HARQ process collides with a transmission of the second HARQ process scheduled so as to use short processing time, the medium access control layer processing unit sets an ACK for a transport block in a state variable HARQ_FEEDBACK of the first HARQ process, based on an indication from the HARQ entity.

(8B) Based on the communication method according to the seventh aspect, in an eighth aspect of the present invention, for FDD, a physical uplink shared channel (PUSCH) reception corresponding to the second HARQ process is performed in a third subsequent subframe from a subframe in which the uplink grant has been transmitted.

A program running on the base station apparatus 3 and the terminal apparatus 1 according to an aspect of the present invention may be a program that controls a Central Processing Unit (CPU) and the like, such that the program causes a computer to operate in such a manner as to realize the functions of the above-described embodiment according to an aspect of the present invention. The information handled in these devices is temporarily stored in a Random Access Memory (RAM) while being processed. Thereafter, the information is stored in various types of Read Only Memory (ROM) such as a Flash ROM and a Hard Disk Drive (HDD), and when necessary, is read by the CPU to be modified or rewritten.

Note that the terminal apparatus 1 and the base station apparatus 3 according to the above-described embodiment may be partially achieved by a computer. In that case, this configuration may be realized by recording a program for realizing such control functions on a computer-readable recording medium and causing a computer system to read the program recorded on the recording medium for execution.

Note that it is assumed that the "computer system" mentioned here refers to a computer system built into the terminal apparatus 1 or the base station apparatus 3, and the computer system includes an OS and hardware components such as a peripheral apparatus. Furthermore, the "computer-readable recording medium" refers to a portable medium such as a flexible disk, a magneto-optical disk, a ROM, a CD-ROM, and the like, and a storage apparatus such as a hard disk built into the computer system.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the program may be configured to realize some of the functions described above, and also may be configured to be capable of realizing the functions described above in combination with a program already recorded in the computer system.

Furthermore, the base station apparatus 3 according to the above-described embodiment may be achieved as an aggregation (apparatus group) including multiple apparatuses. Each of the apparatuses configuring such an apparatus group may include some or all portions of each function or each functional block of the base station apparatus 3 according to the above-described embodiment. The apparatus group may include each general function or each functional block of the base station apparatus 3. Furthermore, the terminal apparatus 1 according to the above-described embodiment can also communicate with the base station apparatus as the aggregation.

Furthermore, the base station apparatus 3 according to the above-described embodiment may serve as an Evolved Universal Terrestrial Radio Access Network (EUTRAN). Furthermore, the base station apparatus 3 according to the above-described embodiment may have some or all portions of the functions of a node higher than an eNodeB.

Furthermore, some or all portions of each of the terminal apparatus 1 and the base station apparatus 3 according to the above-described embodiment may be typically achieved as an LSI which is an integrated circuit or may be achieved as a chip set. The functional blocks of each of the terminal apparatus 1 and the base station apparatus 3 may be individually achieved as a chip, or some or all of the functional blocks may be integrated into a chip. Furthermore, a circuit integration technique is not limited to the LSI, and may be realized with a dedicated circuit or a general-purpose processor. Furthermore, in a case that with advances in semiconductor technology, a circuit integration technology with which an LSI is replaced appears, it is also possible to use an integrated circuit based on the technology.

Furthermore, according to the above-described embodiment, the terminal apparatus has been described as an example of a communication apparatus, but the present invention is not limited to such a terminal apparatus, and is applicable to a terminal apparatus or a communication apparatus of a fixed-type or a stationary-type electronic apparatus installed indoors or outdoors, for example, such as an Audio-Video (AV) apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of one aspect of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

INDUSTRIAL APPLICABILITY

An aspect of the present invention can be utilized, for example, in a communication system, communication equipment (for example, a cellular phone apparatus, a base station apparatus, a wireless LAN apparatus, or a sensor device), an integrated circuit (for example, a communication chip), or a program.

REFERENCE SIGNS LIST 1 (1A, 1B, 1C) Terminal apparatus
3 Base station apparatus
10 Radio transmission and/or reception unit
11 Antenna unit
12 RF unit
13 Baseband unit
14 Higher layer processing unit
15 Medium access control layer processing unit
16 Radio resource control layer processing unit
30 Radio transmission and/or reception unit
31 Antenna unit
32 RF unit
33 Baseband unit
34 Higher layer processing unit
35 Medium access control layer processing unit
36 Radio resource control layer processing unit

The invention claimed is:

1. A terminal apparatus comprising:
a receiver configured to receive a physical downlink control channel (PDCCH) including an uplink grant; and
a medium access control layer processing unit configured to manage a hybrid automatic repeat request (HARQ) entity, wherein
the HARQ entity manages a first HARQ process and a second HARQ process in parallel,
in a case that the uplink grant is not indicated for the first HARQ process and a transmission time interval (TTI) and a HARQ buffer of the first HARQ process is not empty, the HARQ entity indicates to the first HARQ process to generate a non-adaptive retransmission, and
in a case that the non-adaptive retransmission of the first HARQ process collides with a transmission of the second HARQ process scheduled so as to use short processing time, the medium access control layer processing unit sets an ACK for a transport block in a state variable HARQ_FEEDBACK of the first HARQ process, based on an indication from the HARQ entity.

2. The terminal apparatus according to claim 1, wherein for FDD, a physical uplink shared channel (PUSCH) transmission corresponding to the second HARQ process is performed in a third subsequent subframe from a subframe in which the uplink grant has been received.

3. A base station apparatus comprising:
a transmitter configured to transmit a physical downlink control channel (PDCCH) including an uplink grant; and
a medium access control layer processing unit configured to manage a hybrid automatic repeat request (HARQ) entity, wherein
the HARQ entity manages a first HARQ process and a second HARQ process in parallel,
in a case that the uplink grant is not indicated for the first HARQ process and a transmission time interval (TTI) and a HARQ buffer of the first HARQ process is not empty, the HARQ entity indicates to the first HARQ process to generate a non-adaptive retransmission, and
in a case that the non-adaptive retransmission of the first HARQ process collides with a transmission of the second HARQ process scheduled so as to use short processing time, the medium access control layer processing unit sets an ACK for a transport block in a state variable HARQ_FEEDBACK of the first HARQ process, based on an indication from the HARQ entity.

4. The base station apparatus according to claim 3, wherein
for FDD, a physical uplink shared channel (PUSCH) reception corresponding to the second HARQ process is performed in a third subsequent subframe from a subframe in which the uplink grant has been transmitted.

5. A communication method used for a terminal apparatus, the communication method comprising:
a reception step of receiving a physical downlink control channel (PDCCH) including an uplink grant; and
a medium access control layer processing step of managing a hybrid automatic repeat request (HARQ) entity, wherein
the HARQ entity manages a first HARQ process and a second HARQ process in parallel,
in a case that the uplink grant is not indicated for the first HARQ process and a transmission time interval (TTI) and a HARQ buffer of the first HARQ process is not empty, the HARQ entity indicates to the first HARQ process to generate a non-adaptive retransmission, and in a case that the non-adaptive retransmission of the first HARQ process collides with a transmission of the second HARQ process scheduled so as to use short processing time, the medium access control layer processing unit sets an ACK for a transport block in a state variable HARQ_FEEDBACK of the first HARQ process, based on an indication from the HARQ entity.

6. The communication method according to claim 5, wherein for FDD, a physical uplink shared channel (PUSCH) transmission corresponding to the second HARQ process is performed in a third subsequent subframe from a subframe in which the uplink grant has been received.

7. A communication method used for a base station apparatus, the communication method comprising:

a transmission step of transmitting a physical downlink control channel (PDCCH) including an uplink grant; and a medium access control layer processing step of managing a hybrid automatic repeat request (HARQ) entity, wherein the HARQ entity manages a first HARQ process and a second HARQ process in parallel, in a case that the uplink grant is not indicated for the first HARQ process and a transmission time interval (TTI) and a HARQ buffer of the first HARQ process is not empty, the HARQ entity indicates to the first HARQ process to generate a non-adaptive retransmission, and in a case that the non-adaptive retransmission of the first HARQ process collides with a transmission of the second HARQ process scheduled so as to use short processing time, the medium access control layer processing unit sets an ACK for a transport block in a state variable HARQ_FEEDBACK of the first HARQ process, based on an indication from the HARQ entity.

8. The communication method according to claim 7, wherein for FDD, a physical uplink shared channel (PUSCH) reception corresponding to the second HARQ process is performed in a third subsequent subframe from a subframe in which the uplink grant has been transmitted.

* * * * *